US007094490B2

(12) United States Patent
Cao et al.

(10) Patent No.: US 7,094,490 B2
(45) Date of Patent: Aug. 22, 2006

(54) ION CONDUCTIVE BLOCK COPOLYMERS

(75) Inventors: Shuguang Cao, Mountain View, CA (US); Helen Xu, Sunnyvale, CA (US); Thomas Jeanes, Antioch, CA (US); Kie Hyun Nam, Palo Alto, CA (US); Jian Ping Chen, Palo Alto, CA (US)

(73) Assignee: Polyfuel, Inc., Mountain View, CA (US)

( * ) Notice: Subject to any disclaimer, the term of this patent is extended or adjusted under 35 U.S.C. 154(b) by 0 days.

(21) Appl. No.: 10/438,299

(22) Filed: May 13, 2003

(65) Prior Publication Data
US 2004/0126666 A1   Jul. 1, 2004

Related U.S. Application Data

(60) Provisional application No. 60/449,299, filed on Feb. 20, 2003, provisional application No. 60/381,136, filed on May 14, 2002.

(51) Int. Cl.
*H01M 8/10* (2006.01)
(52) U.S. Cl. .............................. 429/33; 429/30; 429/46; 429/306; 429/310; 429/313; 429/314; 204/296
(58) Field of Classification Search ................ 429/30, 429/33, 46, 306, 310, 313, 314; 204/296
See application file for complete search history.

(56) References Cited

U.S. PATENT DOCUMENTS

| | | | |
|---|---|---|---|
| 3,113,049 A | 12/1963 | Worsham | |
| 3,134,697 A | 5/1964 | Niedrach | |
| 3,282,875 A | 11/1966 | Connolly et al. | |
| 3,297,484 A | 1/1967 | Niedrach | |
| 3,301,893 A | 1/1967 | Putnam et al. | |
| 3,684,747 A | 8/1972 | Coalson et al. | |
| 3,692,569 A | 9/1972 | Grot | |
| 4,036,714 A | 7/1977 | Spitzer | |
| 4,038,213 A | 7/1977 | McClure et al. | |
| 4,176,215 A | 11/1979 | Molnar et al. | |
| 4,242,421 A | 12/1980 | Kudo et al. | |
| 4,262,063 A | 4/1981 | Kudo et al. | |
| 4,303,551 A | 12/1981 | Vaughan | |
| 4,380,598 A | 4/1983 | Robeson et al. | |
| 4,390,603 A | 6/1983 | Kawana et al. | |
| 4,407,905 A | 10/1983 | Takeuchi et al. | |
| 4,417,969 A | 11/1983 | Ezzell et al. | |
| 4,419,486 A | 12/1983 | Rose | |
| 4,453,991 A | 6/1984 | Grot | |
| 4,478,917 A | 10/1984 | Fujita et al. | |
| 4,537,840 A | 8/1985 | Tsukui et al. | |
| 4,542,079 A | 9/1985 | Takeuchi et al. | |
| 4,612,261 A | 9/1986 | Tsukui et al. | |
| 4,673,624 A | 6/1987 | Hockaday | |
| 4,751,274 A | 6/1988 | Ittemann et al. | |
| 4,755,272 A | 7/1988 | Plowman | |
| 4,774,153 A | 9/1988 | Sterzel | |
| 4,797,190 A | 1/1989 | Peck | |
| 4,808,493 A | 2/1989 | Breault | |
| 4,828,941 A | 5/1989 | Sterzel | |
| 4,855,193 A | 8/1989 | McElroy | |
| 4,865,925 A | 9/1989 | Ludwig et al. | |
| 4,876,115 A | 10/1989 | Raistrick | |
| 4,964,890 A | 10/1990 | Reuter et al. | |
| 5,061,581 A | 10/1991 | Narang et al. | |
| 5,102,751 A | 4/1992 | Narang et al. | |
| 5,132,193 A | 7/1992 | Reddy et al. | |
| 5,134,207 A | 7/1992 | McGrath et al. | |
| 5,186,877 A | 2/1993 | Watanabe | |
| 5,211,984 A | 5/1993 | Wilson | |
| 5,234,777 A | 8/1993 | Wilson | |
| 5,252,410 A | 10/1993 | Wilkinson et al. | |
| 5,262,250 A | 11/1993 | Watanabe | |
| 5,281,680 A | 1/1994 | Grot | |
| 5,284,718 A | 2/1994 | Chow et al. | |
| 5,312,876 A | 5/1994 | Dang et al. | |
| 5,312,895 A | 5/1994 | Dang et al. | |
| 5,330,860 A | 7/1994 | Grot et al. | |
| 5,346,780 A | 9/1994 | Suzuki | |
| 5,362,836 A | 11/1994 | Helmer-Metzmann et al. | |
| 5,367,051 A | 11/1994 | Narang et al. | |
| 5,403,675 A | 4/1995 | Ogata et al. | |
| 5,422,411 A | 6/1995 | Wei et al. | |
| 5,438,082 A | 8/1995 | Helmer-Metzmann et al. | |
| 5,463,005 A | 10/1995 | Desmarteau | |
| 5,468,574 A | 11/1995 | Ehrenberg et al. | |
| 5,470,448 A | 11/1995 | Molter et al. | |
| 5,472,799 A | 12/1995 | Watanabe | |
| 5,480,735 A | 1/1996 | Landsman et al. | |
| 5,482,568 A | 1/1996 | Hockaday | |
| 5,488,087 A | 1/1996 | Cabasso et al. | |

(Continued)

FOREIGN PATENT DOCUMENTS

EP    0 034 248 B1    8/1981

(Continued)

OTHER PUBLICATIONS

Cho, C., et al., "Synthesis and characterization of poly(arylene ether sulfone) copolymers with sulfonimide side groups," journal publication unknown.

(Continued)

*Primary Examiner*—Bruce F. Bell
(74) *Attorney, Agent, or Firm*—Dorsey & Whitney LLP; Richard F. Trecartin

(57) ABSTRACT

This invention relates to ion conductive copolymers which are useful in forming polymer electrolyte membranes used in fuel cells.

15 Claims, No Drawings

U.S. PATENT DOCUMENTS

| | | |
|---|---|---|
| 5,498,639 A | 3/1996 | Wei et al. |
| 5,505,851 A | 4/1996 | Wagenar et al. |
| 5,523,177 A | 6/1996 | Kosek et al. |
| 5,525,436 A | 6/1996 | Savinell et al. |
| 5,540,981 A | 7/1996 | Gallagher et al. |
| 5,547,911 A | 8/1996 | Grot |
| 5,548,055 A | 8/1996 | Narang et al. |
| 5,561,202 A | 10/1996 | Helmer-Metzmann et al. |
| 5,573,866 A | 11/1996 | Van Dine et al. |
| 5,573,867 A | 11/1996 | Zafred et al. |
| 5,599,638 A | 2/1997 | Surampudi et al. |
| 5,602,185 A | 2/1997 | Stone et al. |
| 5,624,965 A | 4/1997 | Huang et al. |
| 5,631,099 A | 5/1997 | Hockaday |
| 5,633,098 A | 5/1997 | Narang et al. |
| 5,635,039 A | 6/1997 | Cisar et al. |
| 5,637,652 A | 6/1997 | Kato et al. |
| 5,656,389 A | 8/1997 | Tetzlaff et al. |
| 5,672,438 A | 9/1997 | Banerjee et al. |
| 5,672,439 A | 9/1997 | Wilkinson et al. |
| 5,679,482 A | 10/1997 | Ehrenberg et al. |
| 5,702,755 A | 12/1997 | Mussell |
| 5,702,838 A | 12/1997 | Yasumoto et al. |
| 5,723,086 A | 3/1998 | Ledjeff et al. |
| 5,731,104 A | 3/1998 | Ventura et al. |
| 5,741,408 A | 4/1998 | Helmer-Metzmann et al. |
| 5,759,712 A | 6/1998 | Hockaday |
| 5,773,162 A | 6/1998 | Surampudi et al. |
| 5,773,480 A | 6/1998 | Stone et al. |
| 5,783,325 A | 7/1998 | Cabasso et al. |
| 5,795,496 A | 8/1998 | Yen et al. |
| 5,795,668 A | 8/1998 | Banerjee |
| 5,804,325 A | 9/1998 | Yepez |
| 5,834,523 A | 11/1998 | Steck et al. |
| 5,834,566 A | 11/1998 | Helmer-Metzmann et al. |
| 5,863,673 A | 1/1999 | Campbell et al. |
| 5,869,416 A | 2/1999 | Mussell |
| 5,874,182 A | 2/1999 | Wilkinson et al. |
| 5,874,616 A | 2/1999 | Howells et al. |
| 5,882,810 A | 3/1999 | Mussell et al. |
| 5,885,338 A | 3/1999 | Nigam et al. |
| 5,906,716 A | 5/1999 | Mertesdorf et al. |
| 5,945,231 A | 8/1999 | Narayanan et al. |
| 5,952,119 A | 9/1999 | Wilson |
| 5,958,613 A | 9/1999 | Hamada et al. |
| 5,958,616 A | 9/1999 | Salinas et al. |
| 5,973,025 A | 10/1999 | Nigam et al. |
| 5,985,477 A | 11/1999 | Iwasaki et al. |
| 5,985,942 A | 11/1999 | Steck et al. |
| 5,989,742 A | 11/1999 | Cabasso et al. |
| 5,992,008 A | 11/1999 | Kindler |
| 6,024,848 A | 2/2000 | Dufner et al. |
| 6,025,085 A | 2/2000 | Savinell et al. |
| 6,040,077 A | 3/2000 | Debe et al. |
| 6,045,934 A | 4/2000 | Enami |
| 6,057,054 A | 5/2000 | Barton et al. |
| 6,060,190 A | 5/2000 | Campbell et al. |
| 6,068,941 A | 5/2000 | Fuller et al. |
| 6,071,635 A | 6/2000 | Carlstrom et al. |
| 6,080,500 A | 6/2000 | Fuju et al. |
| 6,083,638 A | 7/2000 | Taniguchi et al. |
| 6,090,193 A | 7/2000 | Nigam et al. |
| 6,093,500 A | 7/2000 | Margiott et al. |
| 6,103,411 A | 8/2000 | Matsubayashi et al. |
| 6,106,965 A | 8/2000 | Hirano et al. |
| 6,110,333 A | 8/2000 | Spethmann et al. |
| 6,110,613 A | 8/2000 | Fuller |
| 6,110,616 A | 8/2000 | Sheikh-Ali et al. |
| 6,117,222 A | 9/2000 | Nigam et al. |
| 6,117,579 A | 9/2000 | Gyoten et al. |
| 6,136,463 A | 10/2000 | Kindler et al. |
| 6,146,781 A | 11/2000 | Surampudi et al. |
| 6,150,047 A | 11/2000 | Yen et al. |
| 6,171,444 B1 | 1/2001 | Nigam |
| 6,171,721 B1 | 1/2001 | Narayanan et al. |
| 6,175,512 B1 | 1/2001 | Hagihara et al. |
| 6,180,274 B1 | 1/2001 | Yoshimoto et al. |
| 6,214,488 B1 * | 4/2001 | Helmer-Metzmann et al. .................... 429/29 |
| 6,214,891 B1 | 4/2001 | Schneller et al. |
| 6,221,523 B1 | 4/2001 | Chun et al. |
| 6,228,518 B1 | 5/2001 | Kindler |
| 6,241,787 B1 | 6/2001 | Nigam |
| 6,248,460 B1 | 6/2001 | Surampudi et al. |
| 6,248,469 B1 | 6/2001 | Formato et al. |
| 6,248,480 B1 | 6/2001 | Narang et al. |
| 6,252,000 B1 | 6/2001 | O'Brien |
| 6,252,785 B1 | 6/2001 | Hagihara et al. |
| 6,254,748 B1 | 7/2001 | Surampudi et al. |
| 6,265,093 B1 | 7/2001 | Surampudi et al. |
| 6,266,576 B1 | 7/2001 | Okada et al. |
| 6,277,447 B1 | 8/2001 | Chun et al. |
| 6,291,093 B1 | 9/2001 | Kindler et al. |
| 6,294,612 B1 | 9/2001 | O'Brien |
| 6,294,614 B1 | 9/2001 | Kataoka et al. |
| 6,299,744 B1 | 10/2001 | Narayanan et al. |
| 6,300,381 B1 | 10/2001 | Kerres |
| 6,303,244 B1 | 10/2001 | Surampudi et al. |
| 6,309,772 B1 | 10/2001 | Zuber et al. |
| 6,326,097 B1 | 12/2001 | Hockaday |
| 6,329,094 B1 | 12/2001 | Yasuo et al. |
| 6,355,149 B1 | 3/2002 | Soczka-Guth et al. |
| 6,359,019 B1 | 3/2002 | Stone et al. |
| 6,365,293 B1 | 4/2002 | Isono et al. |
| 6,368,492 B1 | 4/2002 | Narayanan et al. |
| 6,383,391 B1 | 5/2002 | Ehrenberg et al. |
| 6,383,676 B1 | 5/2002 | Akiyama et al. |
| 6,391,486 B1 | 5/2002 | Narayanan et al. |
| 6,399,235 B1 | 6/2002 | Yen et al. |
| 6,413,298 B1 | 7/2002 | Wnek et al. |
| 6,420,059 B1 | 7/2002 | Surampudi et al. |
| 6,423,784 B1 | 7/2002 | Hamrock et al. |
| 6,426,160 B1 | 7/2002 | Hagino et al. |
| 6,432,284 B1 | 8/2002 | Narayanan et al. |
| 6,437,011 B1 | 8/2002 | Steck et al. |
| 6,444,341 B1 | 9/2002 | Yen et al. |
| 6,451,921 B1 | 9/2002 | Weisse et al. |
| 6,468,696 B1 | 10/2002 | Siling et al. |
| 6,492,054 B1 | 12/2002 | Karakane et al. |
| 6,503,378 B1 | 1/2003 | Fisher |
| 6,503,650 B1 | 1/2003 | Yasuo et al. |
| 6,509,441 B1 | 1/2003 | Kerres |
| 6,523,699 B1 | 2/2003 | Akita et al. |
| 6,559,237 B1 | 5/2003 | Mao et al. |
| 6,586,561 B1 | 7/2003 | Litt et al. |
| 6,589,684 B1 | 7/2003 | Surampudi et al. |
| 6,602,630 B1 | 8/2003 | Gopal |
| 6,610,789 B1 | 8/2003 | Watakabe et al. |
| 6,632,847 B1 | 10/2003 | Soczka-Guth et al. |
| 6,649,295 B1 | 11/2003 | Hamrock et al. |
| 6,689,501 B1 | 2/2004 | Stone et al. |
| 6,699,611 B1 | 3/2004 | Kim et al. |
| 6,761,989 B1 | 7/2004 | Terahara et al. |
| 6,790,931 B1 | 9/2004 | Cui et al. |
| 2001/0031388 A1 | 10/2001 | Hamrock et al. |
| 2001/0037000 A1 | 11/2001 | Goto et al. |
| 2001/0041279 A1 | 11/2001 | Terahara et al. |
| 2001/0050230 A1 | 12/2001 | Surampudi et al. |
| 2001/0056128 A1 | 12/2001 | Steck et al. |
| 2002/0001744 A1 | 1/2002 | Tsusaka et al. |
| 2002/0002240 A1 | 1/2002 | Michot et al. |
| 2002/0004159 A1 | 1/2002 | Totsuka |
| 2002/0015868 A1 | 2/2002 | Surampudi et al. |
| 2002/0015872 A1 | 2/2002 | Surampudi et al. |

| | | | | | | |
|---|---|---|---|---|---|---|
| 2002/0015875 | A1 | 2/2002 | Kim | JP | 2003022824 | 1/2003 |
| 2002/0045085 | A1 | 4/2002 | Formato et al. | JP | 2003055457 | 2/2003 |
| 2002/0058178 | A1 | 5/2002 | Narayanan et al. | JP | 2003123792 A | 4/2003 |
| 2002/0061431 | A1 | 5/2002 | Koyama et al. | JP | 2003147074 | 5/2003 |
| 2002/0061432 | A1 | 5/2002 | Nakano et al. | JP | 2003147075 | 5/2003 |
| 2002/0071977 | A1 | 6/2002 | Lakshmanan et al. | JP | 2003147076 | 5/2003 |
| 2002/0091225 | A1 | 7/2002 | McGrath et al. | JP | 2003217365 | 7/2003 |
| 2002/0093008 | A1 | 7/2002 | Kerres et al. | JP | 2003288814 A | 10/2003 |
| 2002/0103327 | A1 | 8/2002 | Claub et al. | WO | WO 98/22989 A1 | 5/1998 |
| 2002/0127450 | A1 | 9/2002 | Xie | WO | WO 99/29763 A1 | 6/1999 |
| 2002/0127454 | A1 | 9/2002 | Narang et al. | WO | WO 99/54389 A1 | 10/1999 |
| 2002/0137806 | A1 | 9/2002 | Stone et al. | WO | WO 99/54407 A2 | 10/1999 |
| 2002/0142207 | A1 | 10/2002 | Watakabe et al. | WO | WO 00/05774 A1 | 2/2000 |
| 2002/0161061 | A1 | 10/2002 | Steck et al. | WO | WO 00/09610 A1 | 2/2000 |
| 2002/0161174 | A1 | 10/2002 | Sasaki et al. | WO | WO 00/22684 A2 | 4/2000 |
| 2002/0164513 | A1 | 11/2002 | Asano et al. | WO | WO 00/22684 A3 | 4/2000 |
| 2002/0172850 | A1 | 11/2002 | Asano et al. | WO | WO 00/24796 A1 | 5/2000 |
| 2002/0177656 | A1 | 11/2002 | Goto et al. | WO | WO 00/27513 A2 | 5/2000 |
| 2002/0187377 | A1 | 12/2002 | Shinoda et al. | WO | WO 01/19896 A1 | 3/2001 |
| 2002/0187379 | A1 | 12/2002 | Yasuo et al. | WO | WO 01/70858 A2 | 9/2001 |
| 2002/0188097 | A1 | 12/2002 | Goto et al. | WO | WO 01/70858 A3 | 9/2001 |
| 2003/0012988 | A1 | 1/2003 | Gascoyne et al. | WO | WO 02/25764 A1 | 3/2002 |
| 2003/0013817 | A1 | 1/2003 | Lu | WO | WO 02/082572 A1 | 10/2002 |
| 2003/0035991 | A1 | 2/2003 | Colombo et al. | WO | WO 02/086999 A1 | 10/2002 |
| 2003/0044669 | A1 | 3/2003 | Hidaka et al. | WO | WO 02/103834 A1 | 12/2002 |
| 2003/0054219 | A1 | 3/2003 | Won et al. | WO | WO 03/005474 A2 | 1/2003 |
| 2003/0059657 | A1 | 3/2003 | Stone et al. | WO | WO 03/082956 A1 | 10/2003 |
| 2003/0064268 | A1 | 4/2003 | Fukuda et al. | WO | WO 03/105253 A2 | 12/2003 |
| 2003/0077503 | A1 | 4/2003 | Yoshitake et al. | WO | WO 03/105253 A3 | 12/2003 |
| 2003/0078308 | A1 | 4/2003 | Holdcroft et al. | WO | WO 04/011535 A1 | 2/2004 |
| 2003/0099874 | A1 | 5/2003 | Kim et al. | | | |
| 2003/0104259 | A1 | 6/2003 | Oguri et al. | | | |
| 2003/0113605 | A1 | 6/2003 | Hidaka et al. | | | |
| 2003/0113606 | A1 | 6/2003 | Ritts et al. | | | |
| 2003/0129467 | A1 | 7/2003 | Morishima et al. | | | |
| 2003/0146148 | A1 | 8/2003 | Wu et al. | | | |
| 2003/0148162 | A1 | 8/2003 | Narayanan et al. | | | |
| 2003/0153700 | A1 | 8/2003 | Wu et al. | | | |
| 2003/0166824 | A1 | 9/2003 | Sasaki et al. | | | |
| 2003/0170521 | A1 | 9/2003 | Zhang | | | |
| 2003/0173547 | A1 | 9/2003 | Yamakawa et al. | | | |
| 2003/0194593 | A1 | 10/2003 | Fan et al. | | | |
| 2003/0198854 | A1 | 10/2003 | Watakabe et al. | | | |
| 2003/0211264 | A1 | 11/2003 | Farnsworth et al. | | | |
| 2004/0005490 | A1 | 1/2004 | Fan et al. | | | |
| 2004/0009384 | A1 | 1/2004 | Mathias et al. | | | |
| 2004/0009385 | A1 | 1/2004 | Barnwell et al. | | | |
| 2004/0018410 | A1 | 1/2004 | Dai | | | |
| 2004/0018411 | A1 | 1/2004 | Dai | | | |
| 2004/0038107 | A1 | 2/2004 | Fan et al. | | | |
| 2004/0046717 | A1 | 5/2004 | Asano | | | |
| 2004/0096731 | A1 | 5/2004 | Hama et al. | | | |
| 2004/0186262 | A1 | 9/2004 | Maier et al. | | | |

FOREIGN PATENT DOCUMENTS

| | | |
|---|---|---|
| EP | 0 068 508 B1 | 1/1983 |
| EP | 0 337 626 A1 | 10/1989 |
| EP | 0 574 791 B1 | 6/1993 |
| EP | 1170310 A2 | 1/2002 |
| EP | 1 274 147 A2 | 1/2003 |
| EP | 1274147 A2 | 1/2003 |
| EP | 1323744 A1 | 7/2003 |
| JP | 2002201268 | 7/2002 |
| JP | 2002201269 | 7/2002 |
| JP | 2002201270 | 7/2002 |
| JP | 2002206024 | 7/2002 |
| JP | 2002206025 | 7/2002 |
| JP | 2002206026 | 7/2002 |
| JP | 2002270199 A | 9/2002 |
| JP | 2003020415 | 1/2003 |
| JP | 2003022708 | 1/2003 |
| JP | 2003022709 | 1/2003 |

OTHER PUBLICATIONS

Ghassemi, H., et al., "New multiblock copolymers of sulfonated poly(4-phenyl-2,5-benzophenone) and poly(arylene ether sulfone) for proton exchange membrane," *Polymer Preprints*.

Kerres, J., et al., "Synthesis and characterization of novel acid-base polymer blends for application in membrane fuel cells," *Solid State Ionics*, 125:243-249, North Holland Publishing Co.: Amsterdam, NL (1999).

Kim, Y., et al., "Methanol permeation of sulfonated poly(arylene ether sulfone) block copolymers," *Polymer Preprints* 44(1):1254-1255 (2003).

Landgrebe, A., et al., *Proceedings of the Workshop on Direct Methanol-Air Fuel Cells*, Proc. vol. 92-14, The Electrochemical Society, Inc.; Pennington, NJ (1992).

Mecham, J.B., et al., :"Sulfonated poly(arylene ether)-B-poly(imide) segmented copolymers," *Polymer. Mats. Sci. Eng.* 84:105-108 (2001).

Miyatake, K., et al., "Synthesis and Proton Conductivity of Highly Sulfonated Poly(thiophenylene)," *Macromolecules* 30():2941-2946 (1997).

Miyatake, K., et al., "Synthesis of Poly(phenylene sulfide sulfonic acid) via Poly(sulfonium cation) as a Thermostable Proton-Conducting Polymer," *Macromolecules* 29:6969-6971 (1996).

Parsons, R., et al., "The oxidation of small organic molecules: a survey of recent fuel cell related research," *J. Electroanal. Chem.* 257:9-45 (1988).

Rulkens, R., et al., "Rigid-Rod Polyelectrolytes based on poly(p-phenylene sulfonic acid)," *Ber. Bunsenges. Phys. Chem.* 100(6):707-714 (1996).

Ueda, M., et al., "Synthesis and characterization of aromatic poly(ether sulfone)s containing pendant sodium sulfonate groups," *J. Polymer Sci. A* 31:852-858 (1992).

Wang, F., et al., "Sodium sulfonate-functionalized poly(ether ether ketone)s," *Macromol. Rapid. Commun.* 199:1421-1426 (1998).

Wang, F., et al., "Synthesis of poly(ether ether ketone) containing sodium sulfonate groups as gas dehumidification membrane material," *Macromol. Rapid Commun.* 19:135-137 (1998).

Wang, J.-T., et al., "A $H_2/O_2$ Fuel Cell Using Acid Doped Polybenzimidazole as Polymer Electrolyte," *Proc. 1st Intl. Symp. Proton Conducting Membrane Fuel Cells I*, S. Gottesfeld, et al. (eds.), *Electrochem. Soc. Proc.* 95(23):202-213 (1995).

Wiles, K.B., et al., "Poly(arylene thioether sulfone) copolymers for PEM-based fuel cell systems," *Polymer Preprints* 44(1):1989-1990 (2003).

Wnek, G., et al., "New hydrocarbon proton exchange membranes based on sulfonated styrene-ethylene/butylenes-styrene triblock copolymers," *Electrochem. So. Proc.* 95(23):247-251 (1995).

Xiao, G., et al., "Polyelectrolytes for Fuel Cells Made of Sulfonated Poly(phthalazinone ether ketone)s," *Macromol. Rapid Commun.* 23(8):488-492 (2002).

Xiao, G., et al., "Synthesis and characterization of novel sulfonated poly(arylene ether ketone)s derived from 4,4'-sulfonyl-diphenol," *Polymer Bull.* 48:309-315 (2002).

Allcock et al., "New Proton-Conduction Polymer Membranes for Fuel Cell," Presentation at Pennsylvania State University, Feb. 23, 2003.

An et al., Morphology Control of Poly(Phenylene Oxide) by Ionomeric Poly(Styrenesulfonic Acid Sodium Salt) Copolymers for Fuel Cell Membrane, *Prepr. Pap.-Am. Chem. Soc., Div. Fuel Chem.*, 2004, 49(2), 582-583, no month available.

Bozkurt et al., "PAA/imidazol-based Proton Conducting Polymer Electrolytes," *Journal of Power Sources*, 2003, 123, 126-131, no month available.

Chalkova et al., "Sulfonimide Polyphosphazene-Based $H_2/O_2$ Fuel Cells," *Electrochemical and Solid-State Letters*, 2002, 5(10) A221-A222, no month available.

Cho et al., "Synthesis and Characterization of Poly(Arylene Ether Sulfone) Copolymers with Sulfonimide Side Groups," Submitted to Virginia Polytechnic and State University, Sep. 7, 2003.

Cornelius et al., "Sulfonated Diels-Alder Polyphenylenes in Hydrogen Based PEM Fuel Cells," Fuel Cell Membranes, Abstract, 2003, no month available.

Crutin et al., "Nafion Membranes: High Volume, Low Cost Manufacturing Process," Presented at Fuel Cell Seminar, 2002, no month available.

Deluga et al., "Composite Membranes in Liquid Feed Direct Methanol Fuel Cells," Presentation at University of Minnesota, Oct. 6-8, 1999.

Ding et al., "Solid Polymer Electrolytes Based on Ionic Graft Polymers: Effect of Graft Chain Length on Nano-Structured, Ionic Networks," *Adv. Funct. Mater.*, 2002, 12, 5, 389-394, no month available.

Ding et al., "A Self-Organized Network of Nanochannels Enhances Ion Conductivity Through Polymer Films," *American Chemical Society*, 2001, 13, 7, 2231-2233, no month available.

Doughty et al., "Materials for Portable Power Applications. Materials and Society: From Research to Manufacturing," Presentation at Sandia National Laboratories, Mar. 27, 2002.

Fujimoto et al., "Sulfonated diels-alder polyphenylenes: Synthesis and Properties of a Novel Polyelectrolyte," North American Membrane Society, Abstract, 2003, no month available.

Ghassemi et al., "New Moltiblock Copolymers of Sulfonated Poly(4'-Phenyl-2,5-Benzopehnone) and Poly(Arylene Ether Sulfone) for Proton Exchange Membrane," *Polymer Preprints*, 2003, 44(1), 814-815, no month available.

Gil et al., "Novel Peek Membranes for Fuel Cell Applications," *Polymer Preprints*, 2003, 44(1), 1081-1082, no month available.

Granados-Focil et al., *Polyphenylene Sulfonic Acid: and new PEM*, Presentation at Case Western Reserve University, Cleveland, Ohio, Oct. 17, 2003.

Gulati et al., "A New Polymer Electrode Membrane for Direct Methanol Fuel Cell Applications," ECS Meeting, Paris, Apr. 30, 2003.

Harrison et al., "Influence of Polar Group in Sulfonated Poly(Arylene Ether) Copolymers as Proton Exchange Membranes," Submitted to Virginia Polytechnic and State University, Sep. 7, 2003.

Harrison et al., "Sulfonated Poly(Arylene Ether Sulfones) Containing Hexafluoroisopropylidene Unit: Influence of Sulfonic Acid Position on Stability and Other Properties," *Polymer Preprints*, 2003, 44(1), 849, no month available.

Hill et al., "Synthesis and Characterization of Sulfonated Poly(Arylene Ether Sulfone)/Zirconium Phenylphosphonate Composite Membranes for Proton Exchange Membrane Fuel Cell Applications," *Prepr. Pap.-Am. Chem. Soc., Div. Fuel Chem.*, 2004, 49(2), 584-585, no month available.

Hofmann et al., "Synthesis of Polyhphophazeness with Sulfonimide Side Groups," *Macromolecules*, 2002, 35, 6490-6493, no month available.

Hogarth et al., "High Temperature Membranes for Solid Polymer Fuel Cells," ETSU, 2001, 1-68, no month available.

Huslage et al., "Radiation-grafted Membrane/Electrode Assemblies with Improved Interface," *Electrochimica Acta*, 2002, 48, 247-254, no month available.

Jung et al., "A Performance Evaluation of Direct Methanol Fuel Cell Using Impregnated Tetraethyl-Orthosilicate in Cross-Linked Polymer Membrane," *International Journal of Hydrogen Energy*, 2001, 26, 1263-1269, no month available.

Kallio et al, "Effects of Fuel Cell Test on the Structure of Irradiation Grafted Ion Exchange Membranes Based on Different Fluoropolymers," *Journal of Applied Electrochemistry*, 2003, 33, 505-514, no month available.

Kaur et al., "Polymer Electrolyte Membranes: Blends of Sulfonated Polystyrene and Poly(vinyl alcohol-co-ethylene)," *Prepr. Pap.-Am. Chem. Soc., Div. Fuel Chem.*, 2004, 49(2), 603-604, no month available.

Kerres et al., "Application of different Types of Polyaryl-Bledn Membranes in DMFC," *J. of New Materials of Electrochemical Systems*, 2002, 5, 97-107, no month available.

Kim et al., "Effect of Acidification Treatment and Morphological Stability of Sulfonated Poly(Arylene Ether Sulfone) Copolymer Proton-Exchange Membranes for Fuel-Cell Use Above 100° C," *J. of Polymer Science*, 2003, 41, 2816-2828, no month available.

Kim et al., "Fabrication and Characterization of Heteropolyacid ($H_3PW_{12}O_{40}$)/ Directly Polymerized Sulfonated Polymerized Sulfonated Poly(Arylene Ether Sulfphonate) Copolymer Composite Membranes for Higher Temperature Fuel Cell Applications," *J. of Membrane Science*, 2003, 212, 263-282, no month available.

Kim et al., "Methanol Permeation of Sulfonated Poly(Arylene Ether Sulfone) Block Copolymers," *Polymer Preprints*, 2003, 44(1), 1254-1255, no month available.

Kim et al., "Proton Conductives and Methanol Permeabilities of Membranes Made from Partially Sulfonated Polystyrene-Block-poly(ethyl-ran-butylene)-block-polystyrene Copolymers," 2002, *Journal of Membrane Science*, 207, 129-137, no month available.

Kreuer et al., "On the Development of Proton Conducting Polymer Membranes for Hydrogen and Methanol Fuel Cells," *Journal of Membrane Science*, 2001, 185, 29-39, no month available.

Li et al., "Approaches and Recent Development of Polymer Electrolyte Membranes for Fuel cells Operating Above 100° C," American Chemical Society, 2003, pp. 1-20, no month available.

Li et al., "Direct Synthesis of Disulfonated Poly(Arylene Ether Ketones)S and Investigation of Their Behavior as Proton Exchange Membrane (PEM)," *Prepr. Pap.-Am. Chem. Soc., Div. Fuel Chem.*, 2004, 49(2), 536-537, no month available.

Litt et al., "Task 3. Novel Solid Polymer Electrolytes for the Micro-Hydrogen Fuel Cell," Publication source not provided, Jan. 7, 2000.

Litt et al., "Molecular Design of Rigid Rod Polyelecrolytes: Effect of Structure on Water Retention and Conductivity," *Prepr. Pap.-Am. Chem. Soc., Div. Fuel Chem.*, 2004, 49(2), 594-595, no month available.

Litt et al., "Novel Polyelectronic Membranes; Molecular Design Toward the Synthesis of Materials That Can Retain Wateer and Thus have "High" Conductivities at Low RH," Aug. 2000.

Liu et al., "Membrane Durability in PEM Fuel Cells," *J. of New Materials for Electrochemical Systems*, 2001, 4, 227-231, no month available.

McGrath, "Advances in Proton Exchange Membranes for Fuel Cells," High Temp PEM Group Presentation, 2003, no month available.

Mecham "Direct Polymerization of Sulfonated Poly(Arylene Ether) Random Copolymers and Poly(Imide) Sufonated Poly (Arylene Ether) Segmented Copolymers; New Candidates for Proton Exchange Membrane Fuel Cell Material Systems," Dissertation Submitted to Virginia Polytechnic and State University, Apr. 23, 2001.

Mecham et al., "Synthesis and Characterization of Controlled Molecular Weight Sulfonated Aminofunctional Plly(Arelene Ether Sulfone)S Prepared By Direct Polymerization," *Polymer Preprints*, 2000, 41(2), 1388-1389, no month available.

Motupally et al., "Development of High Temperature Membranes and Improved Cathode Catalysts," DOE Merit Review Presentation, May 19, 2003, UTC Fuel Cells.

Muggll et al., "End-Group Effect on Physical Aging and Polymer Properties for Poly(Ether Sulfones)," *J. of Polymer Science: Part B: Polymer Physics*, 2003, 41, 2850-2860, no month available.

Navarra et al., "PVdF-Based Membranes for DMFC Applications," *Journal of the Electrochemical Society*, 2003, 150(11) A1528-A1532, no month available.

Peled et al., "A Novel Proton-Conducting Membrane," *Electrochemical and Solid-State Letters*, 1998, 1(5), 210-211, no month available.

Prakash et al., "High Efficiency Direct Methanol Fuel Cell Based on Poly(Styrenesulfonic) Acid (PSSA)-Poly(Vinylidenefluoride) (PVDF) Composite Membranes," *The Electrochemical Society*, 2004, Abs. 311, 205th Meeting, no month available.

Rajendran, "Advancements in Direct Methanol Fuel Cell Technology," Presentation at Electrochemical Technology for the 21st Century, Clearwater Beach, Florida, Nov. 14, 2000.

Riechert, "Du Pont and PEM Fuel Cells," Presented at 222nd ACS National Meeting, Chicago, IL, Aug. 26-30, 2001.

Roelofs et al., "Progress in Membranes and Electrode Assemblies for Direct Methanol Fuel Cells," 2002 Fuel Cell Seminar, Palm Springs, CA, Nov. 21, 2002.

Roy et al., "Synthesis and Characterization of Hydroquinone Base Disulfonated Poly(Arylene Ether Sulfones)s via Direct Copolymerization," *Prepr. Pap.-Am. Chem. Soc., Div. Fuel Chem.*, 2004, 49(2), 614-615, no month available.

Sankir et al., "Proton Exchange Membrane Fuel Cells: I. Synthesis and Characterization of Disulfonated Poly(Arylene Ether Benzonitrile) Copolymers," *Prepr. Pap.-Am. Chem. Soc., Div. Fuel Chem.*, 2004, 49(2), 526-527, no month available.

Satolli et al., "Macro- and Microscopic Properties of Nonaqueous Proton Conducting Membranes Based on PAN," *Journal of the Electrochemical Society*, 2003, 150(3), A267-A273, no month available.

Savadogo, "Emerging Membranes for Electrochemical Systems Part II. High Temperature Composite Membranes for the Polymer Electrolyte Fuel Cell (PEFC) Applications," *Journal of Power Sources*, 2004, 127, 135-161, no month available.

Savett et al., "A Comparison of Bis[(perfluoroalkyl)sulfonyl]imide Ionomers and Perfluorosulfonic Acid Ionomers for Applications in PEM Fuel-Cell Technology," J. of the Electrochemical Society, 2002, 149(12) A-1532-A1533, no month available.

Scanlon et al., "Polybenzimidazole Based Segmented Block Copolymers for High Temperature Fuel Cell Membranes," *Prepr. Pap.-Am. Chem. Soc., Div. Fuel Chem.*, 2004, 49(2):522-523, no month available.

Shoba et al., "Sulfonated Aromatic Diamines as Precursors for Polymides for Proton Exchange Membranes," *Polymer Preprints*, 2000, 41(2), 1298-1299, no month available.

Slade et al., "Ionic Conductivity of an Extruded Nafion 1 100 EW Series of Membranes," *J. of Electrochemical Society*, 2002, 149(2), A-1556-A1564, no month available.

Sun et al., "New Polymeric Proton Conductors for Water-Free and High Temperature Fuel Cells," *Prepr. Pap.-Am. Chem. Soc., Div. Fuel Chem.*, 2004, 49(2), 596-598, no month available.

Swier et al., "Design of Polymer Blends for Proton-Exchange Membranes in Fuel Cells," *Prepr. Pap.-Am. Chem. Soc., Div. Fuel Chem.*, 2004, 49(2), 532-533, no month available.

Uan-Zo-li, "The Effects of Structure, Humidity and Aging on the Mechanical Properties of Polymeric Ionomers for Fuel Cell Applications," Dissertation for Master of Science in Material Science and Engineering, Submitted to Virginia Polytechnic and State University, Dec. 2001.

Wang et al., "Synthesis of Poly(Ether Ether Ketone) Containing Sodium Sulfonate Groups as Gas Dehumidification Membrane Material," *Macromol. Rapid Commun.* 1998, 19, 135-137, no month available.

Wang et al., "Sodium Sulfonate-Functionalized Poly(Ether Ether Ketone)s," *Macromol. Chem. Phys.* 1998, 199, 1421-1426, no month available.

Wang et al., "Synthesis of Substituted Poly(P-Phenylene) by Nickel (0) Catalyzed Coupling Reaction and Derived Multiblock Copolymers for Proton Exchange Membrane Fuel Cells," *Prepr. Pap.-Am. Chem. Soc., Div. Fuel Chem.*, 2004, 49(2), 586-587, no month available.

Wang et al., "Synthesis and Characterization of Controlled Molecular Weight Poly(Arylene Ether Sulfone) Copolymers Bearing Sulfonate Groups by Endgroup Analysis," *Polymer Preprint*, 2002, 43, 492-493, no month available.

Watari et al., Water vapor sorption and diffusion properties of sulfonated polyimide membranes, *J. of Membrane Science*, 2003, 219, 137-147, no month available.

Wiles et al., "Disulfonated Poly(Arlene Ether Phenyl Phosphine Oxide Sulfone) Terpolymers for PEM Fuel Cells Systems," *Prepr. Pap.-Am. Chem. Soc., Div. Fuel Chem.*, 2004, 49(2), 538-540, no month available.

Wiles et al., "Poly(Arylene Thioether Sulfone) Copolymers for PEM-Based Fuel Cell Systems," *Polymer Preprints*, 2003, 44(1), 1089-1090, no month available.

Won et al., "Fixation of Nanosized Proton Transport Channels in Membranes," *Macromolecules*, 2003, 36, 3228-3234, no month available.

Won et al., "Structural Characterization and Surface Modification of Sulfonated Polystyrene-(Ethylene-Butylene)-Styrene Triblock Proton Exchange Membranes," *J. of Membrane Science*, 2003, 214, 245-257, no month available.

Xiao et al., "Sulfonated Poly(Thoether Ketone)s With High Oxidation Resistance To Peroxides," *Polymer Preprints*, 2003, 44(1), 1235-1236, no month available.

Yamaguchi et al., "A Pore-Filling Electrolyte Membrane-Electrode Integrated System for a Direct Methanol Fuel Cell Application," *Journal of the Electrochemical Society*, 2002, 149(11), A1448-A1453, no month available.

Yang et al, "Multilayered Membranes with Suppressed Fuel Crossover for Direct Methanol Fuel Cells," *Electrochemistry Communications*, 2004, 6, 231-236, no month available.

Yang et al, "Sulfonated Poly(Ether Ether Ketone) Membranes for Direct Methalnol Fuel Cells," *Electrochemical and Solid-State Letters*, 2003, 6(11), A229-231, no month available.

Yang et al., "Novel Inorganic/Organic Hybrid Electrolyte Membranes," *Prepr. Pap.-Am. Chem. Soc., Div. Fuel Chem.*, 2004, 49(2), 599-600, no month available.

Zelenay et al., "Direct Methanol Fuel Cells," Hydrogen, Fuel Cells & Structure Technologies Program, 2003 Annual Review, Presentation at Lawrence Berkeley National Laboratory, Berkeley, California, May 19-22, 2003.

Zhang et al., "Synthesis, Characterization and Fuel Cell Performance of Poly (2;2'-(P-Phenylene)-5,5'-Bibenzimidazole) as High Temperature Fuel Cell Membrane," *Prepr. Pap.-Am. Chem. Soc., Div. Fuel Chem.*, 2004, 49(2), 588-589, no month available.

* cited by examiner

ION CONDUCTIVE BLOCK COPOLYMERS

This application claims the benefit of U.S. application Ser. No. 60/449,299, filed Feb. 20, 2003 and U.S. application Ser. No. 60/381,136, filed May 14, 2002, under 35 U.S.C §119(e).

TECHNICAL FIELD

This invention relates to ion conductive polymers which are useful in forming polymer electrolyte membranes used in fuel cells.

BACKGROUND OF THE INVENTION

Fuel cells have been projected as promising power sources for portable electronic devices, electric vehicles, and other applications due mainly to their non-polluting nature. Of various fuel cell systems, the polymer electrolyte membrane based fuel cell technology such as direct methanol fuel cells (DMFCs) have attracted much interest thanks to their high power density and high energy conversion efficiency. The "heart" of a polymer electrolyte membrane based fuel cell is the so called "membrane-electrode assembly" (MEA), which comprises a proton conducting polymer electrolyte membrane (PEM) catalyst disposed on the opposite surfaces of the PEM to form a catalyst coated membrane (CCM) and a pair of electrodes (i.e., an anode and a cathode) disposed to be in electrical contact with the catalyst layer.

Proton-conducting membranes for DMFCs are known, such as Nafion® from the E.I. Dupont De Nemours and Company or analogous products from Dow Chemicals. These perfluorinated hydrocarbon sulfonate ionomer products, however, have serious limitations when used in high temperature of the fuel cell is over 80° C. Moreover Nafion®has a very high methanol crossover rate, which impedes its applications in DMFCs.

U.S. Pat. No. 5,773,480, assigned to Ballard Power System, describes a partially flourinated proton conducting membrane from α, β, β- trifluorostyrene). Another disadvantage of this membrane is that it is very brittle, thus has to be incorporated into a supporting matrix.

U.S. Pat. Nos. 6,300,381 and 6,194,474 to Kerrres, et al. describe an acid-base binary polymer blend system for proton conducting membranes, wherein the sulfornated poly (ether sulfone) was made by post-sulfonation of the poly ether sulfone).

M. Ueda in the Journal of Polymer Science, 31(1993): 852, discloses the use of sulfonated monomers to prepare the sulfonated poly(ether sulfone polymers).

U.S. Patent Application US 2002/0091225A1to McGrath, et al. used this method to prepare sulfonated polysulfone polymers. The need for a good membrane for fuel cell operation requires balancing of various properties of the membrane. Such properties included proton conductivity, methanol-resistance, chemical stability and methanol crossover especially for high temperature applications, fast start up of DMFCs, and durability of cell performance. In addition, it is important for the membrane to retain its dimensional stability over the fuel operational temperature range. In the case of a DMFC, methanol oxidation generates enough heat to raise the cell temperature. If the membrane swells significantly, it.will increase methanol crossover. The membrane thus gradually loses its ability to block methanol crossover, resulting in degradation of cell performance. The dimension changes of the membrane also put a stress on the bonding of the membrane-electrode assembly (MEA). Often this results in delamination of the membrane from the electrode after excessive swelling of the membrane. Therefore, maintaining the dimensional stability over a wide temperature range and avoiding excessive membrane swelling are important for DMIFC applications.

SUMMARY OF THE INVENTION

The invention provides ion conductive copolymer compositions which can be used to fabricate polymer electrolyte membranes (PEM's), catalyst coated polymer electrolyte membranes (CCM's) and membrane electrode assemblies (MEA's) which are useful in fuel cells.

The ion conductive block copolymer comprises a non-ionic polymer and an ionic polymer covalently linked either directly or indirectly to each other. At least one of the ionic or non-ionic polymers comprises a block polymer in the ion conductive copolymer. Preferably both the ionic and non-ionic polymers are block polymers. The non-ionic polymer comprises two non-ionic comonomers. The ionic polymer comprises two comonomers where at least one comonomer comprises an ion conducting group such as sulfonic acid. In a preferred embodiment, the ionic and non-ionic monomers are reacted separately to produce ionic and/or non-ionic blocks which may thereafter be combined. The variability of the components of the ion conducting block copolymer provide for the formation of a variety of ion conducting block copolymers. Mixing and matching of these different ionic and non-ionic polymers provides for the formation of the ion conducting block copolymers of the invention.

For example, by adjusting the block size, the overall molecular length, the rigidity and the affinity among the ion conducting copolymers, it is possible to control ion channel size distributions and affinity as well fuel cross-over, stability, solubility and mechanical properties of the ion conductive polymer and the membranes made therefrom.

In addition to the foregoing, additional random ionic and/or non-ionic polymers maybe interspersed between and among the various non-ionic and ionic blocks of the ion conducting polymer.

DETAILED DESCRIPTION

The invention provides ion conductive block copolymers comprising ionic and non-ionic polymers where one or both of the polymers is a block in the copolymer. The invention also provides polymers which are random in length and/or composition which can be covalently interdispersed between or among the ionic and non-ionic polymers of the ion conductive block copolymer. One use of such polymeric materials is in the formation of polymer electrolyte membranes (PEMs), catalyst coated membranes (CCM's) and membrane electrolyte assemblies (MEA's) which may be used in direct methanol fuel cells (DMFCs), and the like.

In a preferred embodiment, the ion conductive block copolymer comprises a non-ionic block comprising monomers made of two non-ionic comonomers and an ionic block comprising an ionic monomer made of two comonomers wherein at least one comonomer comprises an ion conducting group. In general, the ion conductive polymers contain aromatic resides. The ion conductive polymer additionally has groups which facilitate the transport of ions such as $H^+$within and through the copolymer composition.

The ion conductive block copolymer in one embodiment can be represented by the following formula:

$$[(AB)_n(CD)_o]_j \qquad (1)$$

AB represents a non-ionic monomer made of two different non-ionic comonomers A and B. AB is combined with other AB's to form the non-ionic polymer $(AB)_n$. CD represents an ionic monomer made of two different comonomers C and D at least one of which contains an ion conducting group discussed in more detail below. CD is combined with other CD's to form ionic polymer $(CD)_o$. At least one and preferably both of the $(AB)_n$ polymer and $(CD)_o$ polymer are blocks. These ionic and non-ionic polymer are then combined in appropriate proportions to form an ion conducting block copolymer. These units may be combined j-1 times. In the above formula, "n" is an integer between 0 and 100, more preferably between 1 and 100 and o is an integer between 1 and 100. More preferably, each of n and o are independently between 1 and 50, more preferably between 5 and 50, still more preferably between 50 and 150, still more preferably between 100 and 120. The ratio of o divided by n+o, is between .001 and 1, more preferably between 0.15 and 0.7, still more preferably between 0.20 and 0.50.

For example, if n=4, o=1 and j=2, the polymer has the following structure:

(ABABABAB)(CD)-(ABABABAB)(CD)

The region containing AB is the non-ionic region (block) whereas the region containing CD is the ionic region (block).

In general, the non-ionic polymer $(AB)_n$ is formed by combining chemically reactive precursors to A and B under conditions which allow for the formation of $(AB)_n$. However, in some embodiments, it may be desirable to have different A's and/or B's within the non-ionic region. The non-ionic polymer may then be represented as $(AaBb)_n$ where a and b represent the number of different A's and B's and are independently between 1 and n the number of cell temperature. If the membrane swells significantly, it will increase methanol crossover. The membrane thus gradually loses its ability to block methanol crossover, resulting in degradation of cell performance. The dimension changes of the membrane also put a stress on the bonding of the membrane-electrode assembly (MEA). Often this results in delamination of the membrane from the electrode after excessive swelling of the membrane. Therefore, maintaining the dimensional stability over a wide temperature range and avoiding excessive membrane swelling are important for DMFC applications.

SUMMARY OF THE INVENTION

The invention provides ion conductive copolymer compositions which can be used to fabricate polymer electrolyte membranes (PEM's), catalyst coated polymer electrolyte membranes (CCM's) and membrane electrode assemblies (MEA's) which are useful in fuel cells.

The ion conductive block copolymer comprises a non-ionic polymer and an ionic polymer covalently linked either directly or indirectly to each other. At least one of the ionic or non-ionic polymers comprises a block polymer in the ion conductive copolymer. Preferably both the ionic and non-ionic polymers are block polymers. The non-ionic polymer comprises two non-ionic comonomers. The ionic polymer comprises two comonomers where at least one comonomer comprises an ion conducting group such as sulfonic acid. In a preferred embodiment, the ionic and non-ionic monomers are reacted separately to produce ionic and/or non-ionic blocks which may thereafter be combined.

The variability of the components of the ion conducting block copolymer provide for the formation of a variety of ion conducting block copolymers. Mixing and matching of these different ionic and non-ionic polymers provides for the formation of the ion conducting block copolymers of the invention. however, have serious limitations when used in high temperature fuel cell application Nafion® loses conductivity when the operation temperature of the fuel cell is over 800° C. Moreover, Nafion® has a very high methanol crossover rate, which impedes its applications in DMFCs.

U.S. Pat. No. 5,773,480, assigned to Ballard Power System, describes a partially fluorinated proton conducting membrane from α, β, β- trifluorostyrene. One disadvantage of this membrane is its high cost of manufacturing due to the complex synthetic processes for monomer α, β, β- trifluorostyrene and the poor sulfonation ability of poly (α, β, β- trifluorostyrene). Another disadvantage of this membrane is that it is very brittle, thus has to be incorporated into a supporting matrix.

U.S. Pat. Nos. 6,300,381 and 6,194,474 to Kerrres, et al. describe an acid- base binary polymer blend system for proton conducting membranes, wherein the sulfonated poly (ether sulfone) was made by post-sulfonation of the poly (ether sulfone).

M. Ueda in the Journal of Polymer Science, 3 1(1993): 853, discloses the use of sulfonated monomers to prepare the sulfonated poly(ether sulfone polymers).

U.S. Patent Application US 2002/0091225A1 to McGrath, et al. used this method to prepare sulfonated polysulfone polymers.

The need for a good membrane for fuel cell operation requires balancing of various properties of the membrane. Such properties included proton conductivity, methanol-resistance, chemical stability and methanol crossover especially for high temperature applications, fast start up of DMFCs, and durability of cell performance. In addition, it is important for the membrane to retain its dimensional stability over the fuel operational temperature range. In the case of a DMFC, methanol oxidation generates enough heat to raise the (AaBb) units. In this embodiment, the precursors to the different A's and/or B's can be combined to provide for predetermined positioning in the polymer block and/or a random distribution of the different A's and/or B's within $(A_aBb)_n$. For example, if n=3 and a=2 where the amount of $A_1$ is twice the amount of A2 in a given polymer and the position of A2 is at the third position, then the non-ionic block can be represented as a mixture of $A_1BA_1BA_2B$.

The ionic polymer comprising $(CD)_o$ similarly may have the same or different C and/or D, each of which is located at a predetermined or random position in the ionic polymer. The formula representing the ionic region is represented by $(C_cDd)_o$ where c and d represent the number of different C's and D's and are between 1 and o the number of $(C_cD_d)$ units.

In addition to the foregoing, the ion conducting copolymers can be represented by the formula:

$$[(A_aB_b)_n(A_gB_h)_m(C_eD_f)_o(C_eD_f)_p]_1BA_1BA_2B.$$

The ionic polymer comprising $(CD)_o$ similarly may have the same or different C and/or D, each of which is located at a predetermined or random position in the ionic polymer. The formula representing the ionic region is represented by $(C_cD_d)_o$ where c and d represent the number of different C's and D's and are between 1 and o the number of $(C_cD_d)$ units.

In addition to the foregoing, the ion conducting copolymers can be represented by the formula:

$$(2)\ [(A_aB_b)_n(A_gB_h)_m(C_cD_d)_o(C_eD_f)_p] \qquad (2)$$

In this formula $(A_aB_b)_n$ and $(C_cD_d)_o$ and A, B, C and D are the same as above and $(A_gB_h)_m$ and $(C_eD_f)_p$ are polymers which are random in length and/or composition. For the random polymers, m and p are numbers between 0 and 200, more preferably between 1 and 20 which define the length of unit $(A_gB_h)_h$ and $(C_eD_f)$, respectively. g and h are numbers between 0 and m and e and f are numbers between 0 and p. When m is a random number between 1 and m and/or p is a random number between 1 and p the ion conducting compositions comprise non-ionic and/or ionic random polymer components with different lengths. For example in the non-ionic region, if a=2, b=1, n=3 and m=4, $A_1$ and $A_2$ are in predetermined positions in $(A_aB_b)_n$–$(A_gB_h)_n$ the mixture copolymers can be represented as being made up of the following:

($A_1BA_1BA_2B$)(AB)

($A_1BA_1BA_2B$)(ABAB)

($A_1BA_1BA_2B$)(ABABAB)

($A_1BA_1BA_2B$)(ABABABAB)

Similarly, when c=2, o=3, p=3 and $C_1$ and $C_2$ are at predetermined positions in $(C_cD_d)_o$–$(C_eD_f)_p$ the mixture of copolymer can be represented as follows:

($C_1DC_1DC_2D$)(CD)

($C_1DC_1DC_2D$)(CDCD)

($C_1DC_1DC_2D$)(CDCDCD)

Accordingly, block ionic and/or block non-ionic polymers can be combined with polymers with varying tail lengths to form a mixture of distinct ion conducting partial block copolymers. Alternatively, the tail length of the random polymer components can be random among different molecules or random within a particular copolymer.

When there are more than one type of A, B, C and/or D within the random polymers, such different monomers can be in a predetermined position if the length of the random polymer varies or alternatively randomly distributed over the random polymer. For example, if g=2, h=1 and n=3, the random polymer interposed in formula (2) between the non-ionic and/or ionic blocks can be represented as follows:

$A_1BA_1BA_2B$ $A_1BA_2BA_1B$ $A_2BA_1BA_1B$.

In addition, the polymer may be random both in the position of the different monomers in combination with variation in the length of the random polymer.

The distribution of ion conducting groups in formula (2) can be represented by the following formulas:

$(S_{x1}C_c—S_{y1}D_d)_o$             (7)

alone or in combination with:

$(S_{x2}C_e S_{y2}D_f)_p$             (8)

where S is an ion conducting group covalently attached to $C_c$, $D_d$, $C_e$ and/or $D_f$. $X_1$ is the percentage of $C_c$ which contain S, $X_2$ is the percentage of $C_e$ that contains S, $Y_1$ is the percentage of $D_d$ which contains S and $Y_2$ is the percentage of $D_f$ which contains S where $(x=x_1+x_2)$, $(y=y_1+y_2)$ and x+y is the total percentage of the C+D units which contain S. At least one of $x_1$, $x_2$, $y_1$ and $y_2$ must be greater than zero.

Once made, the ionic and/or non-ionic block and optionally random ionic and/or non-ionic polymers are covalently combined to form a block copolymer having at least ionic and/or non-ionic blocks. This polymer may then be combined with itself j–1 times. If different ionic conducting block copolymers are used, they may be combined in a random or in a predetermined pattern or both.

The preparation of the disclosed ionic and non-ionic block and random polymers provides flexibility in the formulation of the ion conductive block copolymer. Mixtures of selected component polymers can be combined in defined ratios to provide copolymers having a variety of physical and chemical properties.

In addition to the foregoing, the composition may be slightly modified depending upon how the various polymers making up the composition are made. For example, if precursor for A is in excess to the precursor for B an additional A will be present in the Similarly, if excess precursor to B is used, there will be an additional B in the same polymer. Similarly, the ion polymer can have an additional D and/or C depending on how the composition is made. Finally, at the juncture of the ionic and non-ionic components, excess A excess B may be present excess B. If, however, approximately molar equivalents are used, the composition will be primarily held in place by covalent bonds rather than additional monomer.

Accordingly, the invention can be defined by the combined formula:

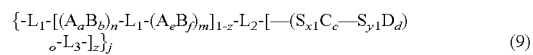
$$\{-L_1-[(A_aB_b)_n-L_1-(A_eB_f)_m]_{1-z}-L_2-[—(S_{x1}C_c—S_{y1}D_d)_o-L_3-]_z\}_j \qquad (9)$$

where $[(A_aB_b)_n-L_1-(A_eB_f)_m]$ comprises a non-ionic hydrophobic region, $[-(S_xC_cS_yD_h)-]$ comprises an ionic hydrophilic region where each of the terms are defined above, $L_1$ is a bond or an additional A and/or B, $L_2$ is a bond, or an additional A and/or D, and $L_3$ is a bond or an additional C and/or D.

Although A and C can be any hydrophobic residue, it is preferred that A and C contain aromatic groups or substituted aromatic groups. Such substitutions are preferably with one or more electron withdrawing groups, most preferably fluorine.

Particularly preferred A and C residues are phenyl, napthyl, terphenyl, aryl nitrile, substituted aryl nitrile, organopolysiloxane $Ar_1—R_1—Ar_2$, where $R_1$ is , —C(O)—, —S(O)$_2$—, —P(O)(C$_6$H$_5$)—, —C(O)—Ar$_3$—C(O)—, or —C(O)—Ar$_4$—S(O)$_2$—, and Ar$_1$, Ar$_2$, Ar$_3$, and Ar$_4$ are aromatic groups and substituted aromatic groups. Such substitutions are preferably with one or more electron withdrawing groups, most preferably with F.

B and D also preferably contain aromatic groups or substituted aromatic groups. Such substitutions are preferably with one or more electron withdrawing groups, most preferably with F. Particularly preferred B and D are:

O—Ar$_5$—R$_2$—Ar$_6$—O—, where R$_2$ is a single bond, cycloaliphatics of the formula $C_nH_{2n-2}$,

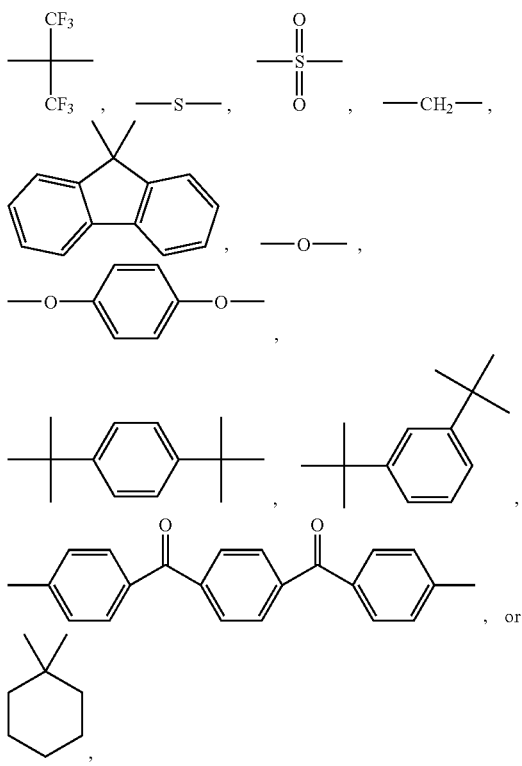

and $Ar_5$ and $Ar_6$ are aromatic groups or substituted aromatic groups.

Preferred embodiments have the formula:

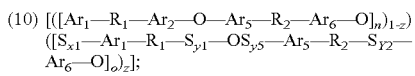

where each of the components are as defined above. When different components of $Ar_1$, $R_1$, $Ar_2$, $Ar_5$, $R_2$, and/or $Ar_6$ are present within the non-ionic and ionic polymer, the distribution of the different components within at least one of the ionic and non-ionic polymers and preferably both can be ordered so as to position the different components at predetermined positions to form one or more blocks in the copolymer.

General methods for the preparation of ion conducting block copolymers are as follows The methods include the steps of combining a first comonomer with a second comonomer. The first comonomer should have at least two leaving groups and the second comonomer should have at least two displacing groups. In one aspect, the second comonomer is in a molar excess relative to the first comonomer, thereby forming a first copolymer with displacing groups on the end of the first copolymer.

A third comonomer that should have at least two leaving groups and a fourth comonomer that should have at least two displacing groups are then combined. The third comonomer preferably is in molar excess relative to the fourth comonomer, thereby forming a second copolymer having leaving groups on the end of the second copolymer.

The first copolymer is combined with the second copolymer (or vice versa), thereby forming the block copolymer. At least one of the first comonomer or the third comonomer includes an ion conducting group such as a sulfonate group.

The term "leaving group" is intended to include those functional moieties that can be displaced by a nucleophilic moiety found, typically, in another monomer. Leaving groups are well recognized in the art and include, for example, halides (chloride, fluoride, iodide, bromide), tosyl, mesyl, etc. In certain embodiments, the monomer has at least two leaving groups, which are "para" to each other with respect to the aromatic monomer to which they are attached.

The term "displacing group" is intended to include those functional moieties that can act typically as nucleophiles, thereby displacing a leaving group from a suitable monomer. The result is that the monomer to which the displacing group is attached becomes attached, generally covalently, to the monomer to which the leaving group was associated with. An example of this is the displacement of fluoride groups from aromatic monomers by phenoxide or alkoxide ions associated with aromatic monomers.

An example of the synthesis of a non-ionic block and ionic block is set forth in formulas (11) and (12) where X is a leaving group and OH is a displacement group.

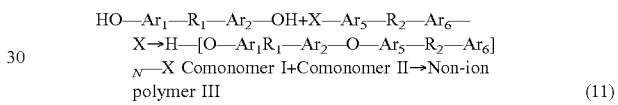

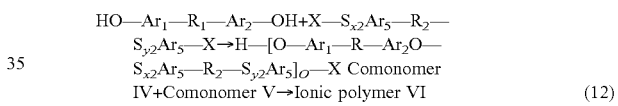

Comonomer I contains two displacement groups (—OH) and comonomer II containing two leaving group (X). The product of the reaction between comonomer I and comonomer II is non-ionic polymer III.

In a separate reaction vessel, monomer IV containing two displacement groups and monomer V containing two leaving groups are combined to produce the ionic polymer VI as shown in formula (12). In each case, the length of the non-ionic and ionic polymers is controlled by reaction conditions including the time, temperature and concentration of the reactants.

Non-ionic polymer III and ionic polymer VI are combined in a reaction vessel to form the ion conducting copolymer VII.

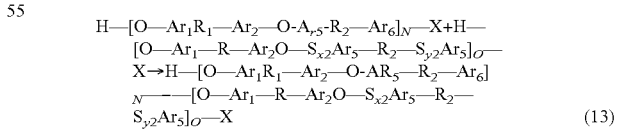

VII

The copolymer can be combined j-1 times.

In a particular preferred embodiment, $R_1$ is —(CO)—, $R_2$ is cyclohexydyl and S is $SO_3$. This is represented by Formula VIII.

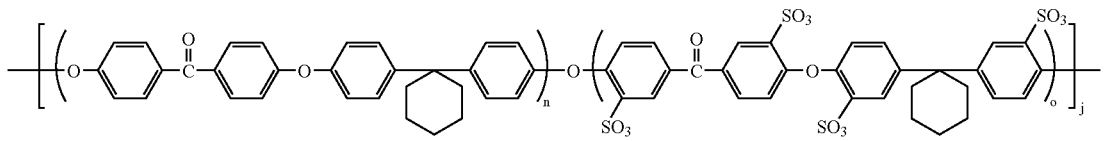

where n=2–20; o=2-20; j=1–200. The four sulfonation sites may or may not contain an $SO_3$ group. However, the total degree of sulfonation is between 10% and 80%.

In another preferred embodiment, $R_1$ is —(CO)—, $R_2$ is bis and S is $SO_3$. This is represented by Formula VIII.

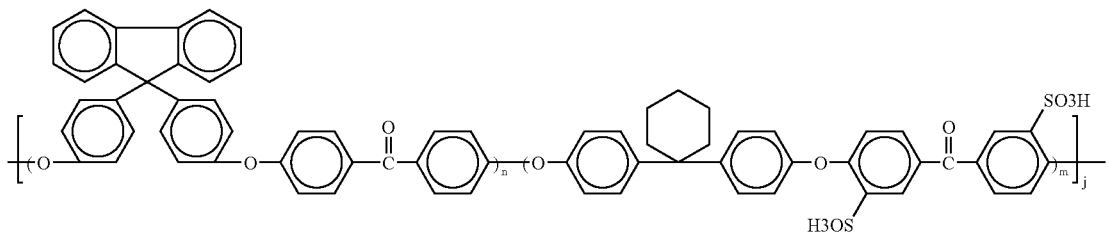

where n=2-20; m=2-20; j=1-200. The four sulfonation sites may or may not contain an $SO_3$ group. However, the total degree of sulfonation is between 10% and 80%.

VIII

Polymer membranes may be fabricated by solution casting of the ion conductive copolymer. Alternatively, the polymer membrane may be fabricated by solution casting the ion conducting polymer the blend of the acid and basic polymer.

When cast into a membrane for use in a fuel cell, it is preferred that the 15 membrane thickness be between 0.1 to 10 mils, more preferably between 1 and 6 mils, most preferably between 1.5 and 2.5 mils, and it can be coated over polymer substrate.

As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion membrane of the same thickness. In preferred embodiments the permeability of methanol is preferably 50% less than that of a Nafion membrane, more preferably 75% less and most preferably greater than 80% less as compared to the Nafion membrane.

After the ion conducting copolymer has been formed into a membrane, it may be used to produce a catalyst coated membrane (CCM). As used herein, a CCM comprises a PEM when at least one side and preferably both of the opposing sides of the PEM are partially or completely coated with catalyst. The catalyst is preferable a layer made of catalyst and ionomer. Preferred catalysts are Pt and Pt—Ru. Preferred ionomers include Nafion and other ion conductive polymers. In general, anode and cathode catalysts are applied onto the membrane by well established standard techniques. For direct methanol fuel cells, platinum/ruthenium catalyst is typically used on the anode side while platinum catalyst is applied on the cathode side. For hydrogen/air or hydrogen/oxygen fuel cells platinum or platinum/ruthenium is generally applied on the anode side, and platinum is applied on the cathode side. Catalysts may be optionally supported on carbon. The catalyst is initially dispersed in a small amount of water (about 100 mg of catalyst in 1 g of water). To this dispersion a 5% ionomer solution in water/alcohol is added (0.25–0.75 g). The resulting dispersion may be directly painted onto the polymer membrane. Alternatively, isopropanol (1–3 g) is added and the dispersion is directly sprayed onto the membrane. The catalyst may also be applied onto the membrane by decal transfer, as described in the open literature (*Electrochimica Acta*, 40: 297 (1995)).

The CCM is used to make MEA's. As used herein, an MEA refers to an ion conducting polymer membrane made from a CCM according to the invention in combination with anode and cathode electrodes positioned to be in electrical contact with the catalyst layer of the CCM.

The electrodes are in electrical contact with the catalyst layer, either directly or indirectly, when they are capable of completing an electrical circuit which includes the CCM and a load to which the fuel cell current is supplied. More particularly, a first catalyst is electrocatalytically associated with the anode side of the PEM so as to facilitate the oxidation of hydrogen or organic fuel. Such oxidation generally results in the formation of protons, electrons and, in the case of organic fuels, carbon dioxide and water. Since the membrane is substantially impermeable to molecular hydrogen and organic fuels such as methanol, as well as carbon dioxide, such components remain on the anodic side of the membrane. Electrons formed from the electrocatalytic reaction are transmitted from the cathode to the load and then to the anode. Balancing this direct electron current is the transfer of an equivalent number of protons across the membrane to the anodic compartment. There an electrocatalytic reduction of oxygen in the presence of the transmitted protons occurs to form water. In one embodiment, air is the source of oxygen. In another embodiment, oxygen-enriched air is used.

The membrane electrode assembly is generally used to divide a fuel cell into anodic and cathodic compartments. In such fuel cell systems, a fuel such as hydrogen gas or an organic fuel such as methanol is added to the anodic compartment while an oxidant such as oxygen or ambient air is allowed to enter the cathodic compartment. Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like. In addition, the fuel cells may be stacked to increase voltage and current capacity for use in high power applications such as industrial and residential sewer services or used to provide locomotion to vehicles. Such fuel cell structures include those disclosed in U.S. Pat. Nos. 6,416,895, 6,413,664, 6,106,964, 5,840,438, 5,773,160, 5,750,281, 5,547,776, 5,527,363, 5,521,018, 5,514,487, 5,482,680, 5,432,021, 5,382,478, 5,300,370, 5,252,410 and 5,230,966.

Such CCM and MEM's are generally useful in fuel cells such as those disclosed in U.S. Pat. Nos. 5,945,231, 5,773,162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

The CCM's and MEA's of the invention may also be used in hydrogen fuel cells which are known in the art.

The ion conducting polymer membranes of the invention also find use as separators in batteries. Particularly preferred batteries are lithium ion batteries.

EXAMPLES

The following examples provide further support for the types of reactions and polymers described throughout this specification.

Example 1 (JC58-42)

Oligomer 1: DP=4

This oligomer was synthesized in a similar way as described in oligomer 1, using following compositions: 4,4'-difluorobenzophone (BisK, 34.91 g, 0.16 mol), 9,9-bis(4-hydroxyphenyl)fluorene (42.05 g, 0.12 mol), and anhydrous potassium carbonate (25.87 g, 0.187 mol), 220 mL of DMSO and 110 mL of toluene.

This block polymer was synthesized in a similar way as described in example 1, using following compositions: 4,4'-difluorobenzophone (BisK, 7.75 g, 0.0355 mol), 3,3'-disulfonated-4,4'-difluorobenzophone ((SBisK, 15.00 g, 0.0355 mol), Oligomer 1 (20.90 g), BisZ (21.47 g, 0.08 mol), and anhydrous potassium carbonate (14.37 g, 0.10 mol), 250 mL of DMSO and 125 mL of toluene. This polymer has an inherent viscosity of 0.49 dl/g in DMAc (0.25 g/dl). Its one-day swelling in 8 M methanol at 80° C. was 52%, cross-over in 8 M methanol was 0.016 mg.mil/cc.min.cm$^2$ (non-boiled, conductivity was 0.013 S/cm (non-boiled) and 0.034 S/cm (boiled).

Example 2 (JC58-73)

This block polymer was synthesized in a similar way as described in example 1, using following compositions: 4,4'-difluorobenzophone (BisK, 5.72 g, 0.026 mol), 3,3'-disulfonated-4,4'-difluorobenzophone ((SBisK, 17.04 g, 0.040 mol), Oligomer 1 (19.59 g), BisZ (20.12 g, 0.075 mol), and anhydrous potassium carbonate (13.47 g, 0.097 mol), 250 mL of DMSO and 125 mL of Toluene. This polymer has an inherent viscosity of 0.72 dl/g in DMAc (0.25 g/dl).

Example 3 (JC58-85)

This block polymer was synthesized in a similar way as described in example 1, using following compositions: 4,4'-difluorobenzophone (BisK, 4.68 g, 0.021 mol), 3,3'-disulfonated-4,4'-difluorobenzophone (SbisK, 19.06 g, 0.045 mol), Oligomer 1 (19.59 g), 9,9-bis(4-hydroxyphenyl)fluorine (26.28 g, 0.075 mol), and anhydrous potassium carbonate (13.47 g, 0.097 mol), 250 mL of DMSO and 125 mL of Toluene.

Example 4 (JC58-86)

This block polymer was synthesized in a similar way as described in example 1, using following compositions: 4,4'-difluorobenzophone (BisK, 4.68 g, 0.021 mol), 3,3'-disulfonated-4,4-difluorobenzophone (SBisK, 19.06 g, 0.040 mol), Oligomer 1 (19.59 g), bisphenol (13.96 g, 0.075 mol), and anhydrous potassium carbonate (13.47 g, 0.075 mol), 250 mL of DMSO and 125 mL of toluene.

Example 5 (JC58-89)

This block polymer was synthesized in a similar way as described in example 1, using following compositions: 4,4'-difluorobenzophone (BisK, 4.68 g, 0.021 mol), 3,3'-disulfonated-4,4'-difluorobenzophone (SBisK, 19.06 g, 0.040 mol), Oligomer 2 (19.59 g),1,5-dihydroxynaphthalene (12.01 g, 0.075 mol), and anhydrous potassium carbonate (13.47 g, 0.097 mol), 250 mL of DMSO and 125 mL of toluene.

Example 6 (JC58-69)

This example illustrates block copolymer system using BisK-O block in the non-ionic region, and SBisK-Z in ionic region, the non-ionic region consists of 11%. Size 6 of BisK-O block.

Oligomer 2: DP=6

This oligomer was synthesized in a similar way as described in oligomer 1, using following compositions: 4,4'-difluorobenzophone (BisK, 65.46 g, 0.30 mol), 4,4'-dihydroxydiphenyl ether (0, 50.55 g, 0.25 mol), and anhydrous potassium carbonate (44.92 g, 0.325 mol), 540 mL of DMSO and 270 mL of toluene.

This block polymer was synthesized in a similar way as described in example 1, using following compositions: 4,4'-diflorobenzophone (BisK, 6.51 g, 0.030 mol), 3,3'-disulfonated-4,4-difluorobenzophone (SBisK, 17.40 g, 0.041 mol), Oligomer 2 (22.40 g), BisZ (21.47 g, 0.08 mol), and anhydrous potassium carbonate (14.37 g, 0.10 mol), 250 mL of DMSO and 125 mL of toluene.

Examples 7–13 illustrate block copolymer system using same BisK-Z in non-ionic region, but sBisK with various aryl phenol groups block having different chain mobility and chemical affinity in the ionic region. The non-ionic block size is 8 and block concentration is 11%.

Example 7 Illustrates Ionic Region Consist of sBisK-Z Unit (JC58-45)

Oligomer 3: DP=8

This oligomer was synthesized in a similar way as described in oligomer 1, using following compositions: 4,4'-difluorobenzophone (BisK, 65.46 g, 0.3 mol), BisZ (70.44 g, 0.262 mol), and anhydrous potassium carbonate (17.97 g, 0.13 mol), 540 mL of anhydrous DMSO (270 mL) of toluene. This block polymer was synthesized in a similar way as described in example 1, using following compositions: 4,4'-difluorobenzophone (BisK, 4.57 g, 0.021 mol), 3,3'-disulfonated-4,4'-difluorobenzophone (SBisZ 17.41 g, 0.041 mol), Oligomer 3 (29.72 g), BisZ (18.78 g, 0.07 mol), and anhydrous potassium carbonate (12.57 g, 0.091 mol), 270 mL of anhydrous DMSO and 135 mL of toluene. This polymer has an inherent viscosity of 0.62 dl/g in DMAc (0.25 g/dl).

Example 8 Illustrates Ionic Region Consist of sBisK-FL Unit (JC58-44:)

This block polymer was synthesized in a similar way as described in example 1, using following compositions: 4,4'-difluorobenzophone (BisK, 3.91 g, 0.0179 mol), 3,3'-disulfonated-4,4'-difluorobenzophone (SBisK, 14.92 g, 0.06 mol), Oligomer 3 (25.27 g), 9,9-bis(4-hydroxyphenyl)fluorene (21.02 g, 0.07 mol), and anhydrous potassium carbonate (10.78 g, 0.078 mol), 250 mL of DMSO and 125 mL of toluene. This polymer has an inherent viscosity of 0.84 dl/g in DMAc (0.25 g/dl).

Example 9 Illustrates Ionic Region Consist of sBisK-AF Unit (JC58-66)

This block polymer was synthesized in a similar way as described in example 1, using following compositions: 4,4'-difluorobenzophone (BisK, 3.91 g, 0.0179 mol), 3,3'-disulfonated-4,4'-difluorobenzophone ((SBisK, 14.92 g, 0.035 mol), Oligomer 3 (25.47 g), 4,4'-(Hexafluoroisopropylidene)-diphenol (20.17 g, 0.06 mol), and anhydrous potassium carbonate (10.78 g, 0.078 mol), 250 mL of DMSO and 125 mL of toluene.

This polymer has an inherent viscosity of 0.47 dl/g in DMAc (0.25 g/dl).

Example 10 Illustrates Ionic Region Consisting of sBisK-B Unit (JC58-61)

This block polymer was synthesized in a similar way as described in example 1, using following compositions: 4,4'-difluorobenzophone (BisK, 4.57 g, 0.021 mol), 3,3'-disulfonated-4,4'-difluorobenzophone (SBisK, 17.41 g, 0.041 mol), Oligomer 3 (29.72 g), 4,4'-dihydroxybiphenyl (13.03 g, 0.07 mol), and anhydrous potassium carbonate (12.57 g, 0.091 mol), 250 mL of DMSO and 125 mL of toluene. This polymer has an inherent viscosity of 1.01 dl/g in DMAc (0.25 g/dl).

Example 11 Illustrates Ionic Region Consisting of sBisK-O Unit (JC58-60)

This block polymer was synthesized in a similar way as described in example 1, using following compositions: 4,4'-difluorobenzophone (BisK, 4.57 g, 0.021 mol), 3,3'-disulfonated-4,4'-difluorobenzophone ((SBisK, 17.41 g, 0.041 mol), Oligomer 3 (29.72 g), 4,4'-dihydroxydiphenyl ether (14.15 g, 0.07 mol), and anhydrous potassium carbonate (12.57 g, 0.091 mol), 250 mL of DMSO and 125 mL of toluene. This polymer has an inherent viscosity of 0.94 dl/g in DMAc (0.25 g/dl).

Example 12 (JC58-76)

This block polymer was synthesized in a similar way as described in example 1, using following compositions: 4,4'-difluorobenzophone (BisK, 1.298 g, 0.0059 mol), 3,3'-disulfonated-4,4'-difluorobenzophone (SBisK, 23.736 g, 0.056 mol), Oligomer 3 (29.72 g), 4,4'-dihydroxydiphenyl (13.03 g, 0.07 mol), and anhydrous potassium carbonate (12.57 g, 0.091 mol), 250 mL of DMSO and 125 mL of toluene. This polymer has an inherent viscosity of 1.35 dl/g in DMAc (0.25 g/dl).

Example 13 (JC58-74)

This block polymer was synthesized in a similar way as described in example 1, using following compositions: 4,4'-difluorobenzophone (BisK, 3.91 g, 0.018 mol), 3,3'-disulfonated-4,4'-difluorobenzophone (SBisK, 14.92 g, 0.035 mol), Oligomer 3 (25.47 g), 1,5-dihydroxynaphthalene (9.61 g, 0.060 mol), and anhydrous potassium carbonate (10.71 g, 0.078 mol), 206 mL of DMSO and 103 mL of Toluene. This polymer has an inherent viscosity of 1.10 dl/g in DMAc (0.25 g/dl).

TABLE 1 summarizes the impact of the chain length and flexible in the ionic region on the final membrane properties from Examples 10–16.

| Polymer | One-day Swelling (%) | Cross-over in 8 M Methanol (mg · mil/ cc · min · cm$^2$) (Non-boiled/boiled) | Conductivity (S/cm) (Non-boiled/boiled) |
| --- | --- | --- | --- |
| Example 7  | 116 | 0.034/0.081 | 0.38/0.055  |
| Example 8  | 46  | 0.025/0.020 | 0.026/0.045 |
| Example 9  | 141 | 0.0320/0.11 | 0.025/0.35  |
| Example 10 | 47  | 0.036       | 0.047/0.075 |
| Example 11 | 155 | 0.038/0.11  | 0.059/0.058 |
| Example 12 | 62  | 0.026/0.046 | 0.061/0.085 |
| Example 13 | 94  | 0.056/0.098 | 0.10/0.11   |

Example 14 illustrates block copolymer system using BisK-Z block in the non-ionic region, and multi components (more than 2 unit) in the ionic region, in comparison of random copolymer of multi components system.

Example 14 (JC 58-50)

This block polymer was synthesized in a similar way as described in example 1, using following compositions: 4,4'-difluorobenzophone (BisK, 3.91 g, 0.0179 mol), 3,3'-disulfonated-4,4'-difluorobenzophone ((SBisK, 14.92 g, 0.035 mol), Oligomer 3 (25.27 g), BisZ (8.05 g, 0.035 mol), 9,9-bis(4-hydroxyphenyl)fluorene (10.51 g, 0.035 mol), and anhydrous potassium carbonate (10.78 g, 0.078 mol), 250 mL of DMSO and 125 mL of toluene. This polymer has an inherent viscosity of 1.02 dl/g in DMAc (0.25 g/dl). Its one-day swelling in 8 M methanol at 80° C. was 63%, cross-over in 8 M methanol was 0.036 mg.mil/cc.min.cm$^2$ (non-boiled) and 0.038 mg.mil/cc.min.cm$^2$ (boiled), conductivity was 0.026 S/cm (non-boiled) and 0.047 S/cm (boiled).

Example 15

Oligomer 1 (FL4): DP=4

In a 500 mL three necked round flask, equipped with a mechanical stirrer, a thermometer probe connected with a nitrogen inlet, and a Dean-Stark trap/condenser, 4,4'-difluorobenzophone (BisK, 34.91 g, 0.16 mol), 9,9-bis(4-hydroxyphenyl)fluorene (42.05 g, 0.12 mol), and anhydrous potassium carbonate (25.87 g, 0.187 mol), 220 mL of DMSO and 110 mL of Toluene. The reaction mixture was slowly stirred under a slow nitrogen stream. After heating at ~85° C. for 1 h and at ~120° C. for 1 h, the reaction temperature was raised to ~135° C. for 3 h, and finally to ~170° C. for 2 h. After cooling to ~70° C. with continuing stirring, the solution was dropped into 1L of cooled methanol with a vigorous stirring. The precipitates were filtrated and washed with DI-water four times and dried at 80° C. overnight, and then dried at 80° C. under vacuum for 2 days.

BlkFL4FL/45 (JC58-85)

This block polymer was synthesized in a similar way as described in the oligomer 1 synthesis, using following compositions: 4,4'-difluorobenzophone (BisK, 4.68 g), 3,3'-disulfonated-4,4'-difluorobenzophone (SBisK, 19.06 g), Oligomer 1 (19.59 g), 9,9-bis(4-hydroxyphenyl)fluorene (26.28 g), and anhydrous potassium carbonate (13.48 g), 240 mL of DMSO and 120 mL of Toluene. This polymer has an inherent viscosity of 1.00 dl/g in DMAc (0.25 g/dl).

BlkFL4B/45 (JC58-86)

This block polymer was synthesized in a similar way as described in the oligomer 1 synthesis, using following compositions: 4,4'-difluorobenzophone (BisK, 4.68 g), 3,3'-disulfonated-4,4'-difluorobenzophone (SBisK, 19.06 g), Oligomer 1 (19.59 g), 4,4'-biphenol (13.97 g), and anhydrous potassium carbonate (13.48 g), 240 mL of DMSO and 120 mL of Toluene. This polymer has an inherent viscosity of 1.89 dl/g in DMAc (0.25 g/dl).

BlkFL4NAP/45 (JC58-89)

This block polymer was synthesized in a similar way as described in the oligomer 1 synthesis, using following compositions: 4,4'-difluorobenzophone (BisK, 4.68 g), 3,3'-disulfonated-4,4'-difluorobenzophone (SBisK, 19.06 g), Oligomer 1 (19.59 g), 2,7-dihydroxynaphthalene (12.01 g), and anhydrous potassium carbonate (13.48 g), 240 mL of DMSO and 120 mL of Toluene. This polymer has an inherent viscosity of 1.00 dl/g in DMAc (0.25 g/dl).

Example 16

Oligomer 2 (A8): DP=8

This oligomer was synthesized as described in the oligomer 1 synthesis, using following compositions: 4,4'-difluorobenzophone (BisK, 87.28 g), 4,4'-(1,4-phenylenediisopropylidene)bisphenol (79.90 g), and anhydrous potassium carbonate (62.88 g), 560 mL of DMSO and 280 mL of Toluene.

BlkA8FL/33 (JC58-93)

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 2 (11.66 g), 9,9-bis(4-hydroxyphenyl)fluorene (10.51 g), and anhydrous potassium carbonate (5.39 g), 120 mL of DMSO and 60 mL of Toluene. This polymer has an inherent viscosity of 0.84 dl/g in DMAc (0.25 g/dl).

BlkA8B/33 (JC58-94)

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 2 (11.66 g), 4,4'-biphenol (5.58 g), and anhydrous potassium carbonate (5.39 g), 120 mL of DMSO and 60 mL of Toluene. This polymer has an inherent viscosity of 1.12 dl/g in DMAc (0.25 g/dl).

BlkA8Z/33 (JC58-95)

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 2 (11.66 g), 1,1-bis(4-hydroxyphenyl)cyclohexane (8.05 g), and anhydrous potassium carbonate (5.39 g), 120 mL of DMSO and 60 mL of Toluene. This polymer has an inherent viscosity of 0.64 dl/g in DMAc (0.25 g/dl).

BlkA8FL/45 (JC58-97)

This block polymer was synthesized in a similar way as described in the oligomer 1 synthesis, using following compositions: 4,4'-difluorobenzophone (BisK, 0.64 g), 3,3'-disulfonated-4,4'-difluorobenzophone (SBisK, 11.88 g), Oligomer 2 (13.60 g), 9,9-bis(4-hydroxyphenyl)fluorene (12.26 g), and anhydrous potassium carbonate (6.29 g), 150 mL of DMSO and 75 mL of Toluene. This polymer has an inherent viscosity of 0.68 dl/g in DMAc (0.25 g/dl).

BlkA8A/33 (JC58-103)

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 2 (11.66 g), 4,4'-(1,4-phenylenediisopropylidene) bisphenol (6.85 g), and anhydrous potassium carbonate (5.39 g), 120 mL of DMSO and 60 mL of Toluene. This polymer has an inherent viscosity of 0.84 dl/g in DMAc (0.25 g/dl).

BlkA8NAP/33 (JC58-106)

Example 17

This block polymer was synthesized in a similar way as described in the oligomer 1 synthesis, using following compositions: 4,4'-difluorobenzophone (BisK, 2.42 g), 3,3'-disulfonated-4,4'-difluorobenzophone (SBisK, 9.37 g), Oligomer 2 (14.57 g), 2,7-dihydroxynaphthalene (6.00 g), and anhydrous potassium carbonate (6.74 g), 120 mL of DMSO and 60 mL of Toluene. This polymer has an inherent viscosity of 0.97 dl/g in DMAc (0.25 g/dl).

Oligomer 3 (AF8): DP=8

This oligomer was synthesized in a similar way as described in the oligomer 1 synthesis, using following compositions: 4,4'-difluorobenzophone (BisK, 87.28 g), 4,4'-(hexafluoroisopropylidene)diphenol (117.69 g), and anhydrous potassium carbonate (62.88 g), 560 mL of DMSO and 280 mL of Toluene.

BlkAF8Z/33 (JC58-113)

This block polymer was synthesized in a similar way as described in the oligomer 1 synthesis, using following compositions: 4,4'-difluorobenzophone (BisK, 3.88 g), 3,3'-disulfonated-4,4'-difluorobenzophone (SBisK, 15.00 g), Oligomer 3 (29.12 g), 1,1-bis(4-hydroxyphenyl)cyclohexane (16.10 g), and anhydrous potassium carbonate (10.78 g), 240 mL of DMSO and 120 mL of Toluene. This polymer has an inherent viscosity of 0.72 dl/g in DMAc (0.25 g/dl).

BlkAF8FL/33 (JC58-114)

This block polymer was synthesized in a similar way as described in the oligomer 1 synthesis, using following compositions: 4,4'-difluorobenzophone (BisK, 3.55 g), 3,3'-disulfonated-4,4'-difluorobenzophone (SBisK, 13.75 g), Oligomer 3 (26.70 g), 9,9-bis(4-hydroxyphenyl)fluorene (19.27 g), and anhydrous potassium carbonate (9.88 g), 240 mL of DMSO and 120 mL of Toluene. This polymer has an inherent viscosity of 0.50 dl/g in DMAc (0.25 g/dl).

BlkAF8B/33 (JC58-115)

This block polymer was synthesized in a similar way as described in the oligomer 1 synthesis, using following compositions: 4,4'-difluorobenzophone (BisK, 4.20 g), 3,3'-disulfonated-4,4'-difluorobenzophone (SBisK, 16.25 g), Oligomer 3 (31.55 g), 4,4'-biphenol (12.10 g), and anhydrous potassium carbonate (11.68 g), 240 mL of DMSO and 120 mL of Toluene. This polymer has an inherent viscosity of 1.29 dl/g in DMAc (0.25 g/dl).

BlkAF8AF/33 (JC58-140)

This block polymer was synthesized in a similar way as described in the oligomer 1 synthesis, using following compositions: 4,4'-difluorobenzophone (BisK, 3.55 g), 3,3'-disulfonated-4,4'-difluorobenzophone (SBisK, 13.75 g), Oligomer 3 (26.70 g), 4,4'-(hexafluoroisopropylidene)diphenol (18.49 g), and anhydrous potassium carbonate (9.88 g), 240 mL of DMSO and 120 mL of Toluene. This polymer has an inherent viscosity of 0.54 dl/g in DMAc (0.25 g/dl).

BlkAF8NAP/33 (JC58-116)

This block polymer was synthesized in a similar way as described in the oligomer 1 synthesis, using following compositions: 4,4'-difluorobenzophone (BisK, 4.20 g), 3,3'-disulfonated-4,4'-difluorobenzophone (SBisK, 16.25 g), Oligomer 3 (31.55 g), 2,7-dihydroxynaphthalene (10.41 g), and anhydrous potassium carbonate (11.68 g), 240 mL of DMSO and 120 mL of Toluene. This polymer has an inherent viscosity of 1.08 dl/g in DMAc (0.25 g/dl).

Example 18

Synthesis of Oligomer with Phenoxide End-groups

The typical synthesis procedure of phenoxide end-group oligomer with repeat unit number or degree of polymerization (DP) of 10 is presented here wherein DP is calculated from the formula DP=1/(1-p) where p is the molar fraction of the second component when the first component is equal to 1: In a 500 ml three necked round flask, equipped with a mechanical stirrer, thermometer, nitrogen inlet and Dean-Stark trap/condenser, bisphenol A(9.128 g), 4,4'-difluorobenzophenone (7.8552 g) and anhydrous potassium carbonate (7.2 g) were dissolved in a mixture of DMSO and toluene (about 20% solid concentration). The mixture was heated to toluene reflux with stirring, keeping the temperature at 150° C. for 4 h, then increasing the temperature to 175–180° C. for 6 h. The reaction mixture was precipitated with acetone or methanol to get the crude product, then washed with hot water four times.

Synthesis of Oligomer with Fluorine End-Groups

The typical synthesis procedure of fluorine end-group oligomer with repeat unit number 10 is presented here. In a 500 ml three necked round flask, equipped with a mechanical stirrer, thermometer, nitrogen inlet and Dean-Stark trap/condenser, bisphenol A(8.2152 g), sulfonated 4,4'-difluorobenzophenone (5.9108 g), 4,4'-difluorobenzophenone (5.6732 g) and anhydrous potassium carbonate (7.2 g) were dissolved in a mixture of DMSO and Toluene (about 20% solid concentration). The mixture was heated to toluene reflux with stirring, keeping the temperature at 150° C. for 4 h, then increasing the temperature to 175–180° C. for 6 h. The reaction mixture was precipitated with acetone or methanol to get the crude product, then washed with hot water four times.

Synthesis of Regular Block Copolymers

When the preparation of the fluorine-terminated oligomer was complete, the solution was cooled to 120° C., and introduced directly into a reaction flask containing the phenoxide-terminated oligomer under nitrogen atmosphere. To obtain the equivalent molar molar ration of a phenoxide end-groups and fluorine end-groups, the phenoxide-terminated oligomer reaction flask was washed three times with 20 ml DMSO, and the solution was combined and also poured in the reaction flask. Then the temperature was again raised to 175–180° C., and maintained there for 6 h. The reaction mixture was filtered and a solid precipitated from acetone or methanol to get the crude product, then washed by hot water four times.

Conductivity: 0.046 S/cm, swelling by area in 8M methanol: 88%, 8M methanol cross-over: $8.3 \times 10^{-7}$ cm$^2$/sec.

Example 19

Synthesis of Partial Block Polymer with Non-Sulfonated Hydrophobic Segment

Fluorine End Group Oligomer Preparation (Segment Size n=4)

In a 500 ml three necked round flask, equipped with a mechanical stirrer, thermometer, nitrogen inlet and Dean-Stark trap/condenser, Bis Z (80.508), Bis K(87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The oligomer precipitates from methanol to get the rude product, then washed by hot water four times. Dry at 80 C oven for one day and 75 C vacuum oven for 2 days.

Polymerization

In a 500 ml three necked round flask, equipped with a mechanical stirrer, thermometer, nitrogen inlet and Dean-Stark trap/condenser, Bis Z (13.418), Bis K(4.8878 g), S-Bis K(9.2884 g),oligomer(11.2112 g), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the crude product.

Conductivity: 0.015 S/cm, Swelling by area in 8M methanol solution: 51%, 8M Methanol Cross-over: $3.5 \times 10^{-7}$ cm$^2$/sec.

Example 20

BPE-3 (BLKZ4Z-28)

Synthesis of Partial Block Polymer with Non-Sulfonated Hydrophobic Segment

Fluorine End Group Oligomer (BisZ/BisK) Preparation (Segment Size n=4)

In a 500 ml three necked round flask, equipped with a mechanical stirrer, thermometer, nitrogen inlet and Dean-Stark trap/condenser, Bis Z (80.508), Bis K(87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80 C oven for one day and 75 C vacuum oven for 2 days.

Polymerization

In a 500 ml three necked round flask, equipped with a mechanical stirrer, thermometer, nitrogen inlet and Dean-Stark trap/condenser, Bis Z (13.418), Bis K(5.2368 g), S-Bis K(8.4444 g), oligomer(12.0112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.014 S/cm (0.038 S/cm, boiled), swelling by area in 8M methanol: 60%, 8M methanol cross-over: 0.019 mg/min.ml.mls.

Example 21

BPE-5 (BLKZ4Z-33)

In a 500 ml three necked round flask, equipped with a mechanical stirrer, thermometer, nitrogen inlet and Dean-Stark trap/condenser, Bis Z (13.418), Bis K(4.8878 g), S-Bis K(9.2884 g), oligomer(11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.0146 S/cm (0.0378 S/cm, boiled), swelling by area in 8M methanol: 51%, 8M methanol cross-over: 0.022 mg/min.ml.mls.

Example 22

BPE-1 (BLKZ6Z-30)

Synthesis of Partial Block Polymer with Non-Sulfonated Hydrophobic Segment

Fluorine End Group Oligomer Preparation (Segment Size n=6)

In a 500 ml three necked round flask, equipped with a mechanical stirrer, thermometer, nitrogen inlet and Dean-Stark trap/condenser, Bis Z (89.4533 g), 4,4'-difluorobenzophone (Bis K, 87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80 C oven for one day and 75 C vacuum oven for 2 days.

Polymerization

In a 500 ml three necked round flask, equipped with a mechanical stirrer, thermometer, nitrogen inlet and Dean-Stark trap/condenser, Bis Z (13.418), Bis K(4.8878 g), 3,3'-disulfonated-4,4'-difluorobenzophone (S-Bis K, 8.444 g), oligomer(9.953 g, n=6, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Example 23

BLKZ4B-30

In a 500 ml three necked round flask, equipped with a mechanical stirrer, thermometer, nitrogen inlet and Dean-Stark trap/condenser, 4,4'-Biphenol (9.3105), Bis K(4.8878 g), S-Bis K(9.2884 g), oligomer(11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.012 S/cm(0.0211 S/cm, boiled), swelling by area in 8M methanol: 21%,

Example 24

BLKZ4B-34

In a 500 ml three necked round flask, equipped with a mechanical stirrer, thermometer, nitrogen inlet and Dean-Stark trap/condenser, 4,4'-Biphenol (8.3794 g), Bis K(1.2444 g), S-Bis K(12.9794 g), oligomer(18.00 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.0427 S/cm(0.078 S/cm, boiled), swelling by area in 8M methanol: 61%, 8M methanol cross-over: 0.052 mg/min.ml.mls.

Example 25

BLKZ4B-36

In a 500 ml three necked round flask, equipped with a mechanical stirrer, thermometer, nitrogen inlet and Dean-Stark trap/condenser, 4,4'-Biphenol (8.3794 g), Bis K(1.1032 g), S-Bis K(13.6625 g), oligomer(15.1777 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.067 S/cm(0.096 S/cm, boiled), swelling by area in 8M methanol: 72%, 8M methanol cross-over: 0.06 mg/min.ml.mls.

Example 26

BLKZ4B-40

In a 500 ml three necked round flask, equipped with a mechanical stirrer, thermometer, nitrogen inlet and Dean-Stark trap/condenser, 4,4'-Biphenol (8.3794), Bis K(0.3078 g), S-Bis K(15.0287 g), oligomer(16.0714 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.072 S/cm(0.0922 S/cm, boiled), swelling by area in 8M methanol: 98%, 8M methanol cross-over: 0.067 mg/min.ml.mls.

Example 27

BLKZ4F-30

In a 500 ml three necked round flask, equipped with a mechanical stirrer, thermometer, nitrogen inlet and Dean-Stark trap/condenser, 4,4'-(Hexafluoroisopropylidene)-diphenol (6F, 16.8065 g), Bis K(4.8878 g), S-Bis K(9.2884 g), oligomer(11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.007 S/cm(0.0122 S/cm, boiled), swelling by area in 8M methanol: 24%, 8M methanol cross-over: 0.016 mg/min.ml.mls.

Example 28

BLKF4Z-30

Synthesis of Partial Block Polymer with Non-sulfonated Hydrophobic Segment

Fluorine End Group Oligomer(6F/BisK) Preparation (Segment Size n=4)

In a 500 ml three necked round flask, equipped with a mechanical stirrer, thermometer, nitrogen inlet and Dean-Stark trap/condenser, 4,4'-(Hexafluoroisopropylidene)-diphenol (6F, 100.839 g), Bis K(87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80 C oven for one day and 75 C vacuum oven for 2days Polymerization In a 500 ml three necked round flask, equipped with a mechanical stirrer, thermometer, nitrogen inlet and Dean-Stark trap/condenser, Bis Z (13.418), Bis K(4.8878 g), S-Bis K(9.2884 g), oligomer(12.7333 g, n=4, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.0114 S/cm(0.0321 S/cm, boiled), swelling by area in 8M methanol: 38%, 8M methanol cross-over: 0.013 mg/min.ml.mls.

Example 29

BLKF4P-30

In a 500 ml three necked round flask, equipped with a mechanical stirrer, thermometer, nitrogen inlet and Dean-Stark trap/condenser, 4,4'-(1,4-phenyldiisopropyldiene)bisphenol (17.30 g), Bis K(4.8878 g), S-Bis K(9.2884 g), oligomer(12.733 g, n=4, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.0102 S/cm(0.0215 S/cm, boiled), swelling by area in 8M methanol: 37%

Example 30

BLKF8Z-30

Synthesis of Partial Block Polymer with Non-sulfonated Hydrophobic Segment

Fluorine End Group Oligomer(6F/BisK) Preparation (Segment Size n=8)

In a 500 ml three necked round flask, equipped with a mechanical stirrer, thermometer, nitrogen inlet and Dean-Stark trap/condenser, 4,4'-(Hexafluoroisopropylidene)-diphenol (6F, 117.6455 g), Bis K(87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80 C oven for one day and 75 C vacuum oven for 2 days Polymerization In a 500 ml three necked round flask, equipped with a mechanical stirrer, thermometer, nitrogen inlet and Dean-Stark trap/condenser, Bis Z (13.418), Bis K(3.2729 g), S-Bis K(12.4151 g), oligomer(24.2454 g, n=8, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173–175° C. for 4–4.5 h. The reaction mixture precipitates from methanol to get the rude product.

Conductivity: 0.011 S/cm(0.0211 S/cm, boiled), swelling by area in 8M methanol: 37%, 8M methanol cross-over: 0.023 mg/min.ml.mls.

Example 31

Following Examples Demonstrate the Effect of Various Block Size and Sulfonation Degree Oligomer Preparation (Block Size n=4) Reference 37-119

In a 2L three necked round bottom flask, equipped with a mechanical stirrer, thermocouple, heating mantle, controller, nitrogen inlet and Dean-Stark trap/condenser, Bis Z (80.508), Bis K(87.28 g), anhydrous potassium carbonate (71.86 g) were dissolved in a mixture DMSO and toluene, 720 ml and 360 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80 C for one day and vacuum dried at 75 C for 2 days.

Polymerization BLKZ4/33 Reference 37-123

In a 500 ml three necked round bottom flask, equipped with a mechanical stirrer, thermocouple, heating mantle, controller, nitrogen inlet and Dean-Stark trap/condenser, Bis Z (13.418), Bis K(4.8878 g), S-Bis K sodium salt (9.2902 g), oligomer (n=4—Reference 37-119) (11.2112 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.67 dL/g. A sample was prepared for GPC analysis by dissolving 50 mg of polymer in 20 ml of DMAc containing 0.1M LiBr. The sample was found to have a peak molecular weight of about 46,350 based upon polystyrene standards.

Polymerization BLKZ4/25 Reference 37-124

In a 500 ml three necked round bottom flask, equipped with a mechanical stirrer, thermocouple, heating mantle, controller, nitrogen inlet and Dean-Stark trap/condenser, Bis Z (13.418), Bis K(6.0441 g), S-Bis K sodium salt (7.0521 g), oligomer (n=4—Reference 37-119) (17.2480 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.49 dL/g.

Polymerization BLKZ4/40 Reference 37-125

In a 500 ml three necked round bottom flask, equipped with a mechanical stirrer, thermocouple, heating mantle, controller, nitrogen inlet and Dean-Stark trap/condenser, Bis Z (13.418 g), Bis K(3.8621 g), S-Bis K sodium salt (11.2750 g), oligomer (n=4—Reference 37-119) (17.2481 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.643 dL/g.

Oligomer Preparation (Block Size n=8) Reference 37-152

In a 2L three necked round bottom flask, equipped with a mechanical stirrer, thermocouple, heating mantle, controller, nitrogen inlet and Dean-Stark trap/condenser, Bis Z (70.4445 g), Bis K(65.4600 g), anhydrous potassium carbonate (47.1912 g) were dissolved in a mixture DMSO and toluene, 540 ml and 270 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80 C for one day and vacuum dried at 75 C for 2 days.

Polymerization BLKZ8/33 Reference 37-134

In a 500 ml three necked round bottom flask, equipped with a mechanical stirrer, thermocouple, heating mantle, controller, nitrogen inlet and Dean-Stark trap/condenser, Bis Z (13.4180 g), Bis K(3.2729 g), S-Bis K sodium salt (12.4151 g), oligomer (n=8) (21.2299 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.90 dL/g.

Polymerization BLKZ8/25 Reference 37-132

In a 500 ml three necked round bottom flask, equipped with a mechanical stirrer, thermocouple, heating mantle, controller, nitrogen inlet and Dean-Stark trap/condenser, Bis Z (13.4180 g), Bis K(4.8223 g), S-Bis K sodium salt (9.4169 g), oligomer (n=8) (21.2296 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.935 dL/g. A sample was prepared for GPC analysis by dissolving 50 mg of polymer in 20 ml of DMAc containing 0.1M LiBr. The sample was found to have a peak molecular weight of about 106,040 based upon polystyrene standards.

Polymerization BLKZ8/40 Reference 37-128

In a 500 ml three necked round bottom flask, equipped with a mechanical stirrer, thermocouple, heating mantle, controller, nitrogen inlet and Dean-Stark trap/condenser, Bis Z (13.4180 g), Bis K(1.8984 g), S-Bis K sodium salt (15.0757 g), oligomer (n=8) (21.2296 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.992 dL/g.

Oligomer Preparation (Block Size n=2) Reference 37-121

In a 2L three necked round bottom flask, equipped with a mechanical stirrer, thermocouple, heating mantle, controller, nitrogen inlet and Dean-Stark trap/condenser, Bis Z (53.6721 g), Bis K(87.2800 g), anhydrous potassium carbonate (71.8692 g) were dissolved in a mixture DMSO and toluene, 750 ml and 360 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80 C for one day and vacuum dried at 75 C for 2 days.

Polymerization BLKZ82/33 Reference 37-140

In a 500 ml three necked round bottom flask, equipped with a mechanical stirrer, thermocouple, heating mantle, controller, nitrogen inlet and Dean-Stark trap/condenser, Bis Z (20.1270 g), Bis K(8.5424 g), S-Bis K sodium salt (11.5917 g), oligomer (n=2) (6.2215), anhydrous potassium carbonate (17.9 g) were dissolved in a mixture dimethylsulfoxide (DMSO) (190 ml) and toluene (100 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days. The dried sample (0.1250 g) was in 25 ml of dimethylacetamide (DMAc) to determine inherent viscosity. The inherent viscosity of the sodium salt polymer was found to be 0.466 dL/g.

Polymerization BLKZ2/25 Reference 37-139

In a 500 ml three necked round bottom flask, equipped with a mechanical stirrer, thermocouple, heating mantle, controller, nitrogen inlet and Dean-Stark trap/condenser, Bis Z (20.1270 g), Bis K(9.9827 g), S-Bis K sodium salt (8.8046 g), oligomer (n=2) (6.2214 g), anhydrous potassium carbonate (27.0629 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The product was oven dried at 80 C for one day and vacuum dried at 75 C for 2 days.

Polymerization BLKZ2/40 Reference 37-137

In a 500 ml three necked round bottom flask, equipped with a mechanical stirrer, thermocouple, heating mantle, controller, nitrogen inlet and Dean-Stark trap/condenser, Bis Z (20.1270 g), Bis K(7.2661), S-Bis K sodium salt (14.0620 g), oligomer (n=2) (6.2217 g), anhydrous potassium carbonate (13.4759 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times.

Oligomer Preparation (Block Size n=12) Reference 37-129

In a 1L three necked round bottom flask, equipped with a mechanical stirrer, thermocouple, heating mantle, controller, nitrogen inlet and Dean-Stark trap/condenser, Bis Z (73.7990 g), Bis K(65.4600 g), anhydrous potassium carbonate (53.9019 g) were dissolved in a mixture DMSO and toluene, 540 ml and 270 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80 C for one day and vacuum dried at 75 C for 2 days.

Polymerization BLKZ12/40 Reference 37-143

In a 500 ml three necked round bottom flask, equipped with a mechanical stirrer, thermocouple, heating mantle, controller, nitrogen inlet and Dean-Stark trap/condenser, Bis Z (20.1270 g), S-Bis K sodium salt (28.1240 g), oligomer (n=12) (31.2316 g), anhydrous potassium carbonate (13.5589 g) were dissolved in a mixture dimethylsulfoxide (DMSO) (300 ml) and toluene (100 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The dried sample (0.1250 g) was in 25 ml of dimethylacetamide (DMAc) to determine inherent viscosity. The inherent viscosity of the sodium salt polymer was found to be 0.490 dL/g.

Polymerization BLKZ8/40-5.6 Reference 37-156

In a 500 ml three necked round bottom flask, equipped with a mechanical stirrer, thermocouple, heating mantle, controller, nitrogen inlet and Dean-Stark trap/condenser, Bis Z (16.1017 g), Bis K (6.3366 g), S-Bis K sodium salt (11.6552 g), oligomer (n=8) (12.7379 g), anhydrous potassium carbonate (10.7841 g) were dissolved in a mixture dimethylsulfoxide (DMSO) (200 ml) and toluene (100 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The polymer was found to have an inherent viscosity of 0.66 dL/g in the proton form.

Polymerization BLKZ8/33-16.8 Reference 37-160

In a 500 ml three necked round bottom flask, equipped with a mechanical stirrer, thermocouple, heating mantle, controller, nitrogen inlet and Dean-Stark trap/condenser, Bis Z (13.4180 g), S-Bis K sodium salt (17.5670 g), oligomer (n=8) (31.8444 g), anhydrous potassium carbonate (8.9837 g) were dissolved in a mixture dimethylsulfoxide (DMSO) (250 ml) and toluene (125 ml) (about 20% solid concentration). The mixture was heated to toluene flux with stirring, keeping the temperature at 140° C. for 6 h, then increase temperature to 173–175° C. for 4–4.5 h. The reaction mixture was precipitated into 2 L of methanol. The polymer was then washed with DI water 4 times. The polymer was found to have an inherent viscosity of 0.83 dL/g in the proton form.

All references cited throughout the specification, including those in the background, are specifically incorporated herein by reference in their entirety.

Although the present invention has been described with reference to preferred embodiments, persons skilled in the art will recognize that changes may be made in form and detail without departing from the spirit and scope of the invention.

The invention claimed is:

1. A polymer electrolyte membrane comprising an ion conducting block copolymer comprising non-ionic and ionic regions having the formula $\{-L_1-[-(A_aB_b)_n]_{1-z}-L_2-[(S_xC_c-S_yD_d)_o]_z L_3\}_j$ wherein $[(A_aB_b)_n]$ comprises a non-ionic block, and
$[(S_xC_c-S_yD_d)_o]$ comprises an ionic block, A and C are phenyl, napthyl, terphenyl, aryl nitrile, substituted aryl nitrile. organopolysiloxane or $Ar_1-R_1-Ar_2$, wherein $R_1$ is, $-C(O)-$, $-S(O)_2-$, $-P(O)(C_6H_5)-$, $-C(O)-Ar_3-C(O)-$, or $-C(O)-Ar_4-S(O)_2-$, and $Ar_1$, $Ar_2$, $Ar_3$, and $Ar_4$ are aromatic groups or substituted aromatic groups and wherein each A and C can be the same or different;

B and D are $-O-Ar_5-R_2-Ar_6-O-$, where $R_2$ is a single bond, a cycloaliphatic of the formula $C_nH_{2n-2}$,

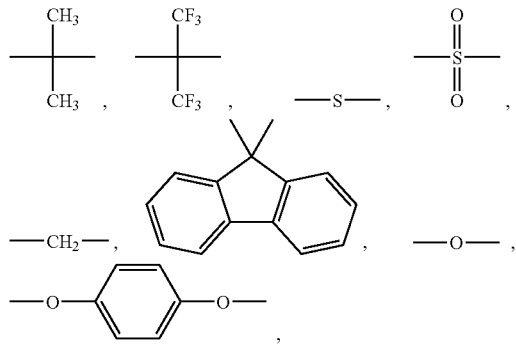

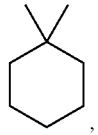

and $Ar_5$ and $Ar_6$ are aromatic groups or substituted aromatic groups and wherein each B and D can be the same or different;

S is an ion conducting group selected from the group $-SO_3H$, $-COOH$, $-PO_3H$, and $SO_2NH_2SO_2Rf$, where $R_f$ is a perlyfluoridated hydrocarbon having 1–20 carbon atoms; wherein S may be the same or different when more than one S is present and wherein $S_x$ is covalently attached to $C_c$ and $S_y$ is covalently attached to $D_d$;

n is an integer between 1 and 100;

o is an integer between 1 and 100;

a and b are integers each between 1 and n, where a indicates the number of different A and b the number of different B present in the non-ionic polymer $(A_aB_b)_n$;

c and d are integers between 1 and o, where c indicates the number of different C and d the number of different D present in the ionic polymer $(S_xC_c-S_yD_d)_o$;

x and y are respectively the percentage of C and D which contain S, wherein at least one of x or y is greater than 0%:

z is o divided by the sum of n and o and has a range from 0.001 to 1.0;

j is an integer between 1 and 200 ; $L_1$ is a bond or an additional B, $L_2$ is a bond or an additional A and/or D, and $L_3$ is a bond or an additional C, and wherein when C is $Ar_1-R_1-Ar_2$ and $R_1$ is $-C(O)-$, y=0.

2. The polymer electrolyte membrane of claim 1 wherein S is randomly distributed within said ionic polymer.

3. The polymer electrolyte membrane of claim 1 wherein S is in predetermined positions within said ionic polymer.

4. The polymer electrolyte membrane of claim 1 wherein said ionic and non-ionic polymers comprise blocks in said ion conductive polymer.

5. The polymer electrolyte membrane of claim 1 wherein o is between 2 and 20, and A and C are $-Ar_1-C(O)-Ar_2-$, B and D are same or different of cyclohexydyl or fluorenyl, S is $SO_3H$, x+y is between 20 and 40%, z is between 0.2 and 0.5 and j is an integer between 60 and 150.

6. A polymer electrolyte membrane comprising an ion conductive block copolymer comprising non-ionic and ionic regions having the formula $\{-L_1-[(A_aB_b)_n-L_1-(A_eB_f)_m]_{1-z}-L_3-[-(S_{x2}C_g-S_{y2}D_h)_p-L_3-(S_{x2}C_g-S_{y2}D_h)_p-L_3-]_z\}_j$ wherein $[(A_eB_f)_m]$ comprises a non-ionic block, and
$[(S_{x1}C_c-S_{y1}D_d)_o-(S_{x2}C_g-S_{y2}D_h)-]$ comprises an ionic block, and wherein at least one of $(A_aB_b)_n$ or $(S_{x1}C_c-S_{y1}D_d)_o$ comprise a block within said ion conducting polymer and $(A_eB_f)_m$ and $(S_{x2}C_g-S_{y2}D_h)$ are polymers that are random in length, composition or both;

A and C are phenyl, napthyl, terphenyl, aryl nitrile , substituted aryl nitrile, organopolysiloxane, $-Ar_1-R_1-Ar_2-$, wherein $R_1$ is, $-C(O)-$, $-S(O)_2-$, $-P(O)(C_6H_5)-$, $-C(O)-Ar_3-C(O)-$, or $-C(O)-Ar_4-S(O)_2-$, and $Ar_1$, $Ar_2$, $Ar_3$, and $Ar_4$ are aromatic groups or substituted aromatic groups, wherein each A and C can be the same or different and wherein B and D are —O—$Ar_5$—$R_2$—$Ar_6$—O—, where $R_2$ is a single bond, a cycloaliphatic of the formula $C_nH_{2n-2}$,

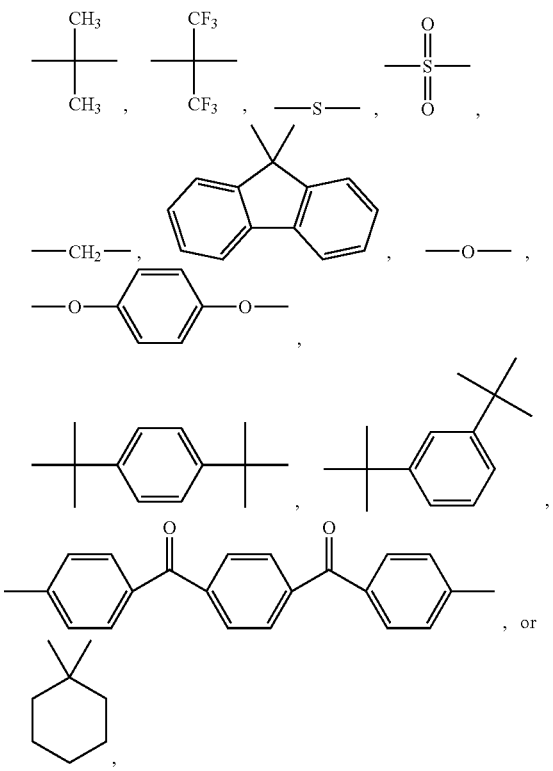

and $Ar_5$ and $Ar_6$ are aromatic groups or substituted aromatic groups, wherein each B and D can be the same or different;

S is an acidic or basic group covalently attached to C and/or D selected from the group —$SO_3H$, —COOH, —$PO_3H$, and $SO_2NH_2SO_2Rf$, where $R_f$ is a perlyfluoridated aliphatic having 1–20 carbon atoms; wherein S may be the same or different when more than one S is present and wherein $S_{x1}$ and $S_{y1}$ are covalently attached to $C_c$ and $D_d$ respectively and $S_{x2}$ and $S_{y2}$ are covalently attached to $C_g$ and $D_h$ respectively;

n is an integer between 1 and 200;

m is an integer between 1 and 200;

a and b are integers each between 1 and n, where a indicates the number of different A and b the number of different B present in the non-ionic polymer $(A_aB_b)_n$;

c and d are integers between 1 and 0, where c indicates the number of different C and d the number of different D present in the hydrophilic polymer $(S_xC_c—S_yD_d)_o$;

e and f are integers each between 0 and m, where e indicates the number of different C and f the number of different D present in the ionic polymer $(A_eB_f)_m$;

g and h are integers between 0 and p, where g indicates the number of different C and h the number of different D present in the ionic polymer $(S_xC_g—S_yD_h)_p$;

x1 and $y_1$ are respectively the percentage of $C_c$ and $D_d$ which contain S, $y_2$ and $y_2$ are preferably the percentage of $C_g$ and $D_h$ which contains S wherein at least one of $x_1$, $x_2$,$y_1$ or $y_2$ is greater than 0%;

z is o plus p divided by the sum of m, n, o and p, where z has a range of from 0.001 to 1.0;

j is an integer between 1 and 200;

each $L_1$ is independently a bond or an additional A and/or B;

each $L_2$ is independently a bond or an additional A and/or D;

each $L_3$ is independently a bond or an additional C and/or D;

m is between 0 and 100 and p is between 0- and 100;

and wherein when p=0 and m=0, and C is —$Ar_1$—$R_1$—$Ar_2$—and $R_1$ is —C(O)—, $y_1$=0.

7. The polymer electrolyte membrane of claim 6 wherein $(A_aB_b)_n$ and $(S_{x1}C_c—S_{y1}D_d)$ comprise blocks within said ion conductive block copolymer.

8. The polymer electrolyte membrane of claim 6 wherein the ion conducting groups S are randomly distributed in the ionic polymer.

9. The polymer electrolyte membrane of claim 6 wherein the ion conducting groups S are located in a predetermined position within said ionic polymer.

10. The polymer electrolyte membrane of claim 6 wherein m and p are random numbers.

11. The polymer electrolyte membrane of claim 6 wherein o is between 2 and 20, n is between 2 and 20, A and C are $Ar_1$—C(O)—$Ar_2$, B and D are

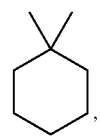

S is $SO_3H$, x+y is between 20 and 40%, z is between 0.2 and 0.5 and j is an integer between 60 and 150.

12. A catalyst coated membrane comprising the polymer electrolyte membrane of claims 1, 2, 3, 4, 5, 6, 7, 8, 9, 10 or 11 wherein all or part of at least one of the opposing surfaces of said membrane comprises a catalyst layer.

13. A membrane electrode assembly (MEA) comprising the catalyst coated membrane of claim 12 and electrodes in electrical contact with said catalyst layer.

14. A fuel cell comprising the membrane electrode assembly of claim 13.

15. An electronic device, system or motor comprising the fuel cell of claim 14.

* * * * *